(12) United States Patent
Chhetri et al.

(10) Patent No.: US 12,074,896 B2
(45) Date of Patent: Aug. 27, 2024

(54) SYSTEMS, METHODS, AND STORAGE MEDIA FOR CONDUCTING SECURITY PENETRATION TESTING

(71) Applicant: CERNER INNOVATION, INC., Kansas City, KS (US)

(72) Inventors: Rajiv Chhetri, Bengaluru Karnataka (IN); Karthickprakash Selvaraj, Bengaluru Karnataka (IN)

(73) Assignee: Cerner Innovation, Inc., Kansas City, MO (US)

( * ) Notice: Subject to any disclaimer, the term of this patent is extended or adjusted under 35 U.S.C. 154(b) by 786 days.

(21) Appl. No.: 16/851,474

(22) Filed: Apr. 17, 2020

(65) Prior Publication Data

US 2021/0329022 A1 Oct. 21, 2021

(51) Int. Cl.
| | |
|---|---|
| *H04L 29/06* | (2006.01) |
| *G06F 9/38* | (2018.01) |
| *G06F 11/36* | (2006.01) |
| *G06F 16/951* | (2019.01) |
| *H04L 9/40* | (2022.01) |
| *H04L 67/561* | (2022.01) |

(52) U.S. Cl.
CPC ........ *H04L 63/1433* (2013.01); *G06F 9/3851* (2013.01); *G06F 11/3684* (2013.01); *G06F 16/951* (2019.01); *H04L 67/561* (2022.05)

(58) Field of Classification Search
CPC ... H04L 43/50; H04L 63/1433; H04L 67/563; H04L 63/101; H04L 63/20; H04L 63/1416; H04L 63/1441; H04L 63/1458; G06F 9/45512; G06F 11/3668; G06F 11/3688; G06F 11/3692; G06F 21/577; G06F 11/3684; G06F 8/71; G06F 21/50; G06F 21/552; G06Q 30/02; A63F 13/00; A61K 38/1709
See application file for complete search history.

(56) References Cited

U.S. PATENT DOCUMENTS

| | | | | |
|---|---|---|---|---|
| 8,612,530 | B1 * | 12/2013 | Sapovalovs | H04L 43/50 |
| | | | | 707/602 |
| 8,904,346 | B1 * | 12/2014 | Strikhalev | G06F 11/3688 |
| | | | | 717/114 |
| 8,949,990 | B1 * | 2/2015 | Hsieh | H04L 63/1433 |
| | | | | 726/25 |
| 9,304,891 | B1 * | 4/2016 | Angleton | G06F 11/3668 |
| 9,558,097 | B2 * | 1/2017 | Schneider | G06F 11/3414 |
| 9,660,870 | B1 * | 5/2017 | Kuhr | G06F 9/45512 |
| 9,774,617 | B2 * | 9/2017 | Rorabaugh | H04L 63/1433 |
| 2005/0071447 | A1 * | 3/2005 | Masek | G06F 11/3688 |
| | | | | 717/124 |

(Continued)

*Primary Examiner* — Dustin Nguyen
(74) *Attorney, Agent, or Firm* — Invoke

(57) ABSTRACT

Methods, systems, and computer-readable media are disclosed herein that conduct security penetration testing. In accordance with embodiments, a security extension is run in a web browser in order to record a user interface workflow and to generate a test script of the user interface workflow. The test script is executed in an application in order to perform penetration testing of the user interface workflow, in some embodiments. Based on the outcomes of the penetration testing, a security report may be generated in order to identify one or more security vulnerabilities in the user interface workflow.

26 Claims, 22 Drawing Sheets

(56) References Cited

U.S. PATENT DOCUMENTS

| | | | |
|---|---|---|---|
| 2005/0132232 A1* | 6/2005 | Sima | G06F 21/577 726/4 |
| 2005/0144315 A1* | 6/2005 | George | H04L 67/563 714/E11.207 |
| 2005/0144324 A1* | 6/2005 | George | G06Q 30/02 709/246 |
| 2006/0069671 A1* | 3/2006 | Conley | G06F 16/9566 707/E17.115 |
| 2009/0037882 A1* | 2/2009 | Allen | G06F 11/3688 717/125 |
| 2012/0036580 A1* | 2/2012 | Gorny | H04L 63/101 726/25 |
| 2012/0072968 A1* | 3/2012 | Wysopal | G06F 21/577 726/1 |
| 2012/0260344 A1* | 10/2012 | Maor | A61K 38/1709 726/25 |
| 2013/0159974 A1* | 6/2013 | Norton | G06F 11/3684 717/124 |
| 2014/0075563 A1* | 3/2014 | Simpson | H04L 63/1433 726/25 |
| 2014/0237606 A1* | 8/2014 | Futoransky | G06F 21/552 726/25 |
| 2015/0295948 A1* | 10/2015 | Hassell | H04L 63/1441 726/25 |
| 2015/0309813 A1* | 10/2015 | Patel | G06F 21/577 703/22 |
| 2016/0314302 A1* | 10/2016 | Sabetta | G06F 21/577 |
| 2016/0352775 A1* | 12/2016 | Naveh | H04L 63/1458 |
| 2017/0109534 A1* | 4/2017 | Compagna | G06F 21/577 |
| 2017/0140660 A1* | 5/2017 | Morton | A63F 13/00 |
| 2017/0270303 A1* | 9/2017 | Roichman | G06F 11/3668 |
| 2018/0018465 A1* | 1/2018 | Carey | G06F 21/50 |
| 2018/0089437 A1* | 3/2018 | Baset | G06F 21/577 |
| 2018/0137286 A1* | 5/2018 | Ionescu | G06F 11/3688 |
| 2018/0219909 A1* | 8/2018 | Gorodissky | H04L 43/50 |
| 2018/0285246 A1* | 10/2018 | Tuttle | G06F 11/302 |
| 2020/0045073 A1* | 2/2020 | Ekambaram | G06F 21/577 |
| 2020/0133829 A1* | 4/2020 | Zazo | G06F 11/3692 |
| 2020/0265144 A1* | 8/2020 | Gwilliams | G06F 11/3684 |
| 2020/0296126 A1* | 9/2020 | Compagna | G06F 11/3692 |
| 2020/0296138 A1* | 9/2020 | Crabtree | H04L 63/20 |
| 2020/0379891 A1* | 12/2020 | Canter | G06F 8/71 |
| 2021/0314341 A1* | 10/2021 | Moskovich | H04L 63/1416 |
| 2021/0334395 A1* | 10/2021 | Robinson | G06F 21/629 |

\* cited by examiner

*FIG. 14.*

```
○ Welcome          ×  ○ The BodgeIt Store  ×  +

← → C  ( 🔒 accessibility.northamerica.company.net:9101/app/home )    ⊕ ☆    ⊖ ○ ⊗ | − ⊡ ×
                                                                                 · adminUS
                                                                                 · Log Out
                                                                                 · Help SecurityCentral
Schedule Security Run
CAC_xccrp-07012020190754 ←— 1308

Solution Group    CAC
           Solution Name     xccrp
              User Name      MK065961
        Time of Creation     07012020190759
        Schedule Status      Not Scheduled
            Run Status       Not Completed Click here to Schedule Security Test    [ Schedule ] ←— 1402
```

SYSTEMS, METHODS, AND STORAGE MEDIA FOR CONDUCTING SECURITY PENETRATION TESTING

BACKGROUND

Penetration testing may be used to probe features of a computer program, such as an application, for security vulnerabilities that could potentially be exploited by cyber-criminals and hackers to steal valuable information or even cryptocurrency. Generally, one or more features of a computer program may unwittingly provide cyber-criminals or hackers with access to backend devices and hidden information, such that those features are considered to be a security vulnerabilities.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The present invention is defined by the claims as supported by the Specification, including the Detailed Description.

One aspect of the present disclosure relates to a system configured for conducting security penetration testing. The system may include one or more hardware processors configured by machine-readable instructions. In embodiments, the processor(s) may be configured to record, via a security extension of a web browser, a user interface workflow. The processor(s) may be configured to generate, via the security extension, a test script that represents the user interface workflow, in an embodiment. The processor(s) may be configured to execute the test script in an application using a proxy port, in one embodiment. Executing the test script recreates the user interface workflow, in some embodiments. The processor(s) may be configured to simulate a cyber-attack against the user interface workflow, in embodiments, as the workflow is recreated by executing the test script in the application. In some embodiments, the processor(s) may be configured to identify a security vulnerability based on the cyber-attack. The processor(s) may be configured to generate a security report that identifies the security vulnerability, in an embodiment.

Another aspect of the present disclosure relates to a method for conducting security penetration testing. In some embodiments, the method may include recording, via a security extension of a web browser, a user interface workflow. The method may include generating, via the security extension, a test script that represents the user interface workflow, in an embodiment. In embodiments, the method may include executing the test script in an application using a proxy port. Executing the test script recreates the user interface workflow, in some embodiments. The method may include, in an embodiment, simulating a cyber-attack against the user interface workflow recreated by executing the test script in the application. In an embodiment, the method may include identifying a security vulnerability based on the cyber-attack. The method may include generating a security report that identifies the security vulnerability, in one embodiment.

Yet another aspect of the present disclosure relates to a non-transitory computer-readable storage medium having instructions embodied thereon, the instructions being executable by one or more processors to perform a method for conducting security penetration testing. The method may include recording, via a security extension of a web browser, a user interface workflow, in embodiments. The method may include generating, via the security extension, a test script that represents the user interface workflow, in some embodiments. The method may include, in an embodiment, executing the test script in an application using a proxy port. Executing the test script may recreate the user interface workflow, in some embodiments. The method may include simulating a cyber-attack against the user interface workflow recreated by executing the test script in the application, in one embodiment. In embodiments, the method may include identifying a security vulnerability based on the cyber-attack. The method may include generating a security report that identifies the security vulnerability, in some embodiments.

BRIEF DESCRIPTION OF THE DRAWINGS

Illustrative embodiments of the present invention are described in detail below with reference to the attached drawing figures, and wherein:

FIG. 14 illustrates an example graphical user interface for scheduling a test script, in accordance with one or more implementations;

FIG. 15 illustrates an example graphical user interface for scheduling a test script, in accordance with one or more implementations;

Figure 16:
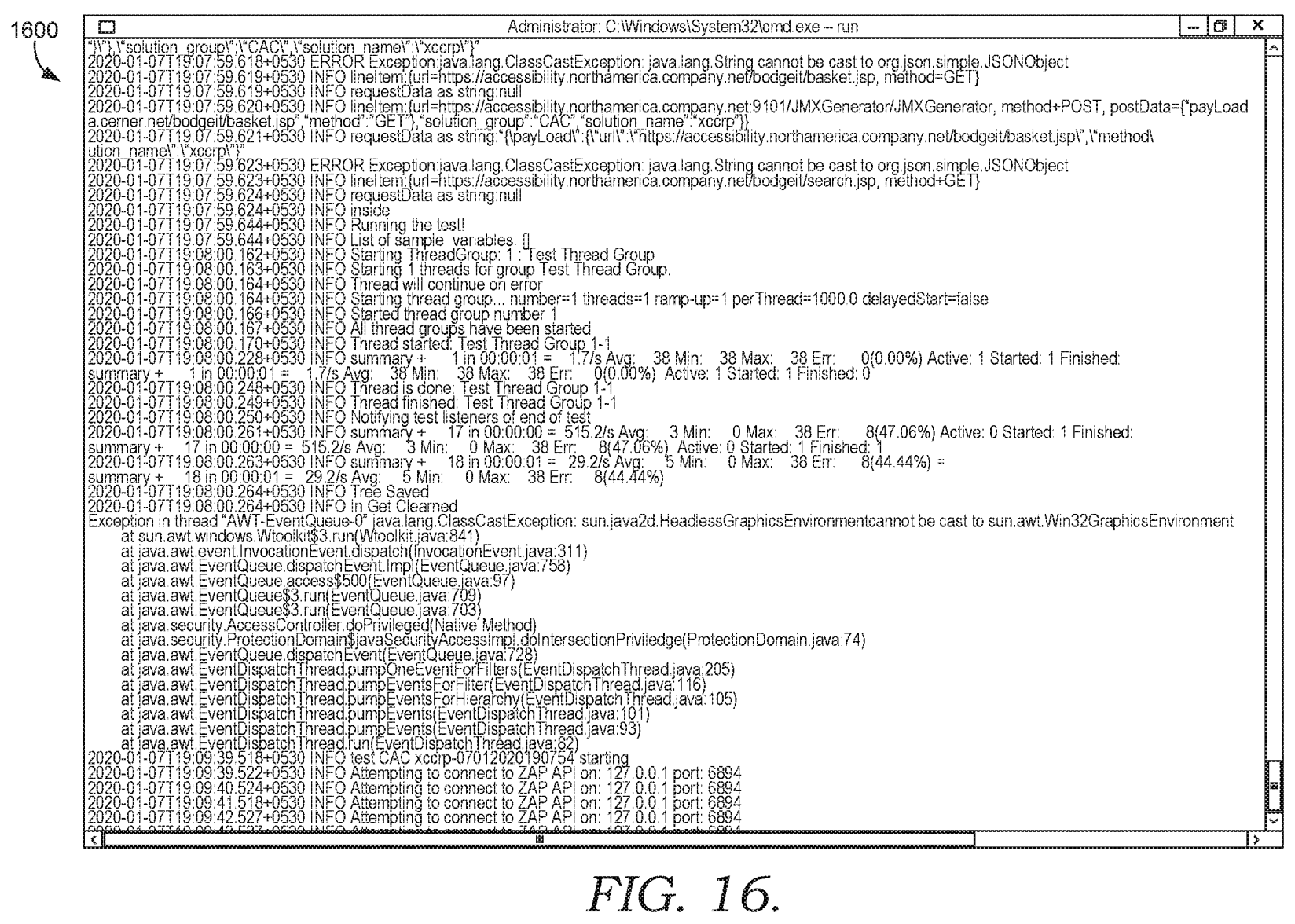

FIG. 16 illustrates an example of the execution of a test script displayed as running computer programming code, in accordance with one or more implementations;

Figure 17:
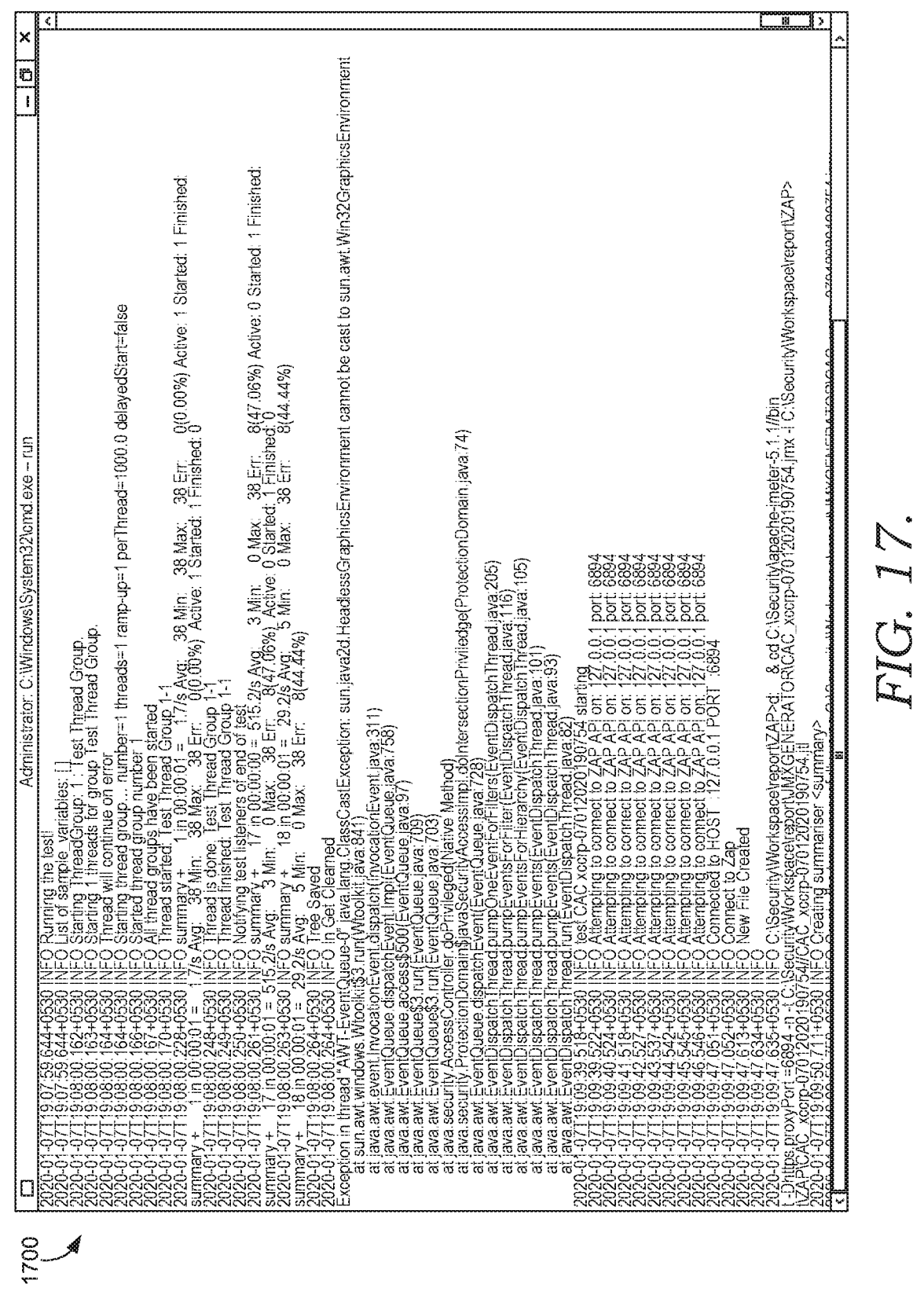

FIG. 17 illustrates an example of the execution of a test script displayed as running computer programming code, in accordance with one or more implementations;

Figure 18:
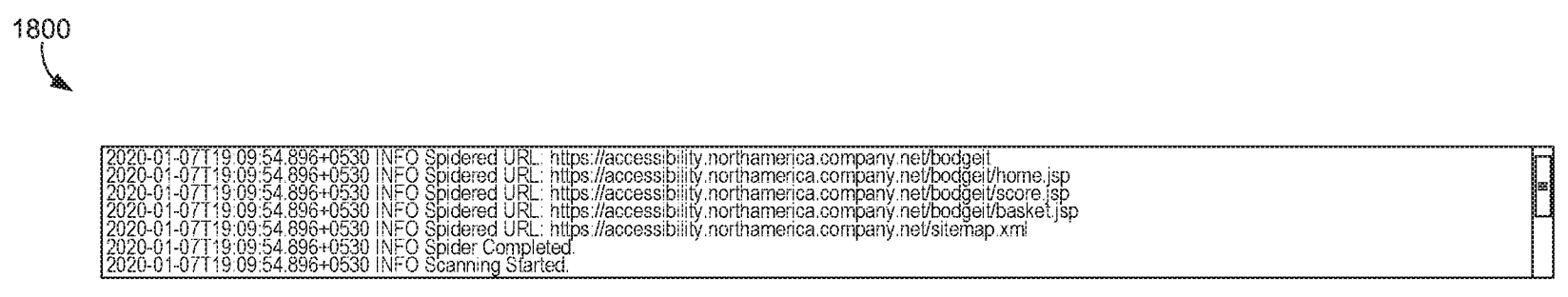

FIG. 18 illustrates an example of the execution of a test script displayed as running computer programming code, in accordance with one or more implementations;

FIG. 21 illustrates an example security report, in accordance with one or more implementations.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described. Further, it will be apparent from this Detailed Description that the technological solutions disclosed herein are only a portion of those provided by the present invention. As such, the technological problems, solutions, advances, and improvements expressly referenced and explained should not be construed in a way that would limit the benefits and application of embodiments of the present invention.

Embodiments herein provide a system, computer-readable media, and methods for performing penetration testing (i.e., also referred to as a "pen test") of a web application to identify, diagnose, and formulate recommendations against security vulnerabilities. In embodiments, one or more functionalities of a web application are recorded and used to generate a test script. The embodiments herein locate all the Universal Resource Locators ("URLs") that are present in a test script, virtually attack all of the URLs located in the test script, and subsequently identify whether the virtual attack(s) were able to penetrate each of the attacked URLs. When a URL is penetrated by the virtual attack, a security vulnerability may be identified as associated with said URL, in embodiments. In this manner, a test script may be used to perform a penetration test and diagnose security vulnerabilities for a web application, using embodiments further discussed herein.

Embodiments herein provide a technological solution that addresses, solves, and overcomes the technological problems and/or shortcomings found in other implementations of penetration testing. A security extension is discussed herein that can be run in one or more different web browsers to automatically record a user interface workflow and automatically generate a test script of the user interface workflow, unlike other penetration testing technologies. The security extension can then pass the test script to an application for scheduling and penetration testing, in embodiments, which facilitates batching, unlike other penetration testing technologies. The application can, in embodiments, perform penetration testing and generate a detailed report that identifies one or more security vulnerability outcomes of the penetration testing.

Figure 1:
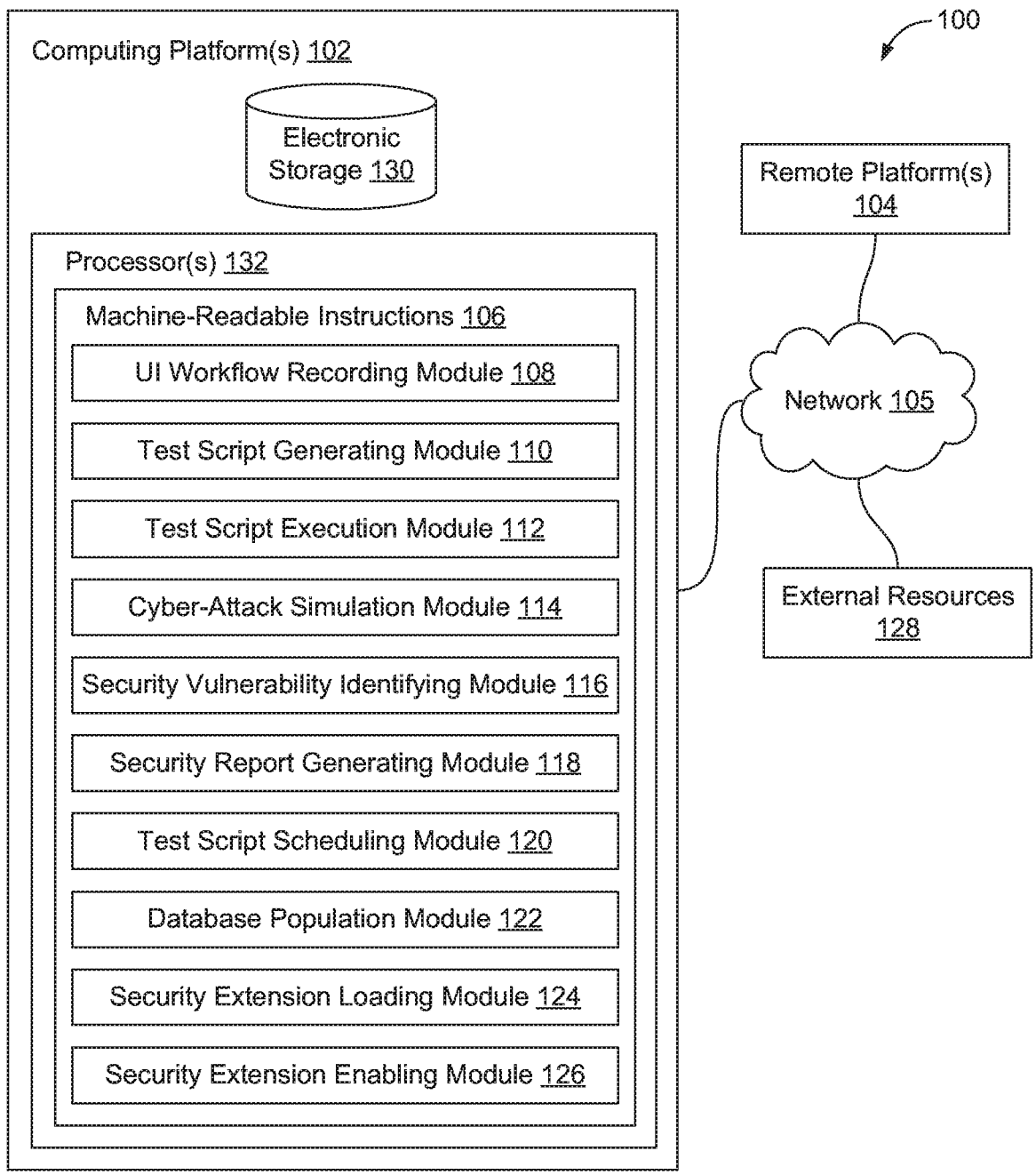
FIG. 1 illustrates a system configured for conducting security penetration testing, in accordance with one or more implementations.

FIG. 1 illustrates a computing environment 100 configured for conducting security penetration testing, in accordance with one or more implementations. In some implementations, computing environment 100 may include one or more computing platforms 102. Computing platform(s) 102 may be configured to communicate with one or more remote platforms 104 according to a client/server architecture, a peer-to-peer architecture, and/or other architectures. Remote platform(s) 104 may be configured to communicate with other remote platforms via computing platform(s) 102 and/or according to a client/server architecture, a peer-to-peer architecture, and/or other architectures. Users may access the computing environment 100 via remote platform(s) 104, using a network 105.

Computing platform(s) 102 may be configured by machine-readable instructions 106. Machine-readable instructions 106 may include one or more instruction modules. The instruction modules may include computer program modules. In embodiments, one or more of the instruction modules may include one or more of user interface workflow recording module 108, test script generating module 110, test script execution module 112, cyber-attack simulation module 114, security vulnerability identifying module 116, security report generating module 118, test script scheduling module 120, database population module 122, security extension loading module 124, security extension enabling module 126, and/or other instruction modules.

In embodiments, one or more of the instruction modules may correspond to a security extension. In one embodiment, user interface workflow recording module 108 and test script generating module 110 provide instructions, composed of computer programming code, that when executed provide a security extension. The security extension may be loaded and enabled within an application, such as a web browser application, for example. The user interface workflow recording module 108 and test script generating module 110 may be integrated with an application and may be used to "run" the security extension within an application, in some embodiments. For example, when operating within an application, the security extension may modify one or more features, functions, content, services, and/or configurations within that application, in embodiments. At a high level, the term "modify" refers to an edit, change, or adjustment being made, such as an addition of a new feature, function, content, service, or configuration, a removal of an existing feature, function, content, service, or configuration, and/or a change in an existing feature, function, content, service, or configuration.

The security extension may, in some embodiments, operate within a web browser. In some embodiments, the security extension may be web browser and/or application "agnostic" (e.g., referred to as technology agnostic) such that the security extension may be compatible with, and thus can be run in, any variety of web browser applications (e.g., Google™ Chrome™, Microsoft™ Edge™, Internet Explorer™, Mozilla™ Firefox™, Apple™ Safari™, Opera™, Brave™, Vivaldi™), independent of the operating system (e.g., Microsoft Windows™, Android™, iOS™, macOS™, Linux™). The security extension may be operated within and/or be interoperable with one or more different web browser applications, in various embodiments. A "web browser" generally refers to an application that is specially configured to provide a user interface for viewing the Internet, retrieving, displaying and interacting with websites, webpages, web directories, Internet-based search engines, and/or Internet-based services, through public, private, encrypted, peer-to-peer, direct, indirect, wired, wireless, telecommunications, remote, and/or local networks.

In further embodiments, security extension loading module 124 and security extension enabling module 126 along with user interface workflow recording module 108 and test script generating module 110 provide instructions, composed of computer programming code, that when executed provide a security extension. Security extension loading module 124 of computing environment 100 may be configured to load the security extension in the web browser, in an embodiment. Additionally, in some embodiments, security extension enabling module 126 may be configured to enable the security extension that is loaded in the web browser using one or more parameters. In an embodiment, the one or more parameters are specified by user input, such as a selection or alphanumeric character entry. In another embodiment, the one or more parameters are automatically selected by a processor. For example, one or more default parameters may be automatically selected. In one example, the one or more parameters are automatically selected as being specific to the particular web browser into which the security extension is loaded. Example parameters may include a group name, may specify a URL to be tested, may specify a particular enterprise version control systems (VCS) such as "Git" or Subversion (SVN), or may include credentials such as a user name and password.

In some embodiments, the security extension includes user interface workflow recording module 108, test script generating module 110, security extension loading module 124, security extension enabling module 126, and/or other instruction modules. User interface workflow recording module 108 of the security extension may be configured to record a user interface workflow. User interface workflow recording module 108 of the security extension may capture, monitory, and/or record all data and processes performed within the web browser for a defined session, in embodiments. Generally, the term "user interface workflow" refers to all of the data and processes performed within the web browser for a defined session or period of time. For example, during a defined session for which the security extension is enabled for the web browser, user interactions via a user interface may cause and/or result in the request for, retrieval of, loading of, and display of one or more websites, webpages, and/or content of one or more URLs are recorded. During the defined session for which the security extension is enabled for the web browser, for example, user interactions via a user interface may cause and/or result in the manual input of data or other information, the sending of a request to a server or external device, the receipt of a response from a server or external device based on the request, and/or the automatic exchange of data or information between the user interface, a server, and/or an external device, based on automatic or manual input via one or more user interface objects (e.g., activation, selection, "hovering" over graphical user interface objects such as buttons, tabs, scroll bars, title bars, characters or commands entered through a keyboard, voice-to-text, or copy-and-paste functions, or selection of a hyperlink) are recorded. At least a portion of manual and/or automatic input, at least a portion of data exchanged, at least a portion of one or more services utilized, at least a portion of one or more URLs retrieved, loaded, or included as a link in a webpage or website, and/or at least a portion of one or more interactions occurring through the web browser and operations, functions, features, and services of the web browser, which together or in various combinations may be referred to more generally as a "user interface workflow," are recorded by user interface workflow recording module 108, in embodiments. In some embodiments, all of the "user interface workflow" generated by, received through, or displayed via the web browser are captured and recorded by user interface workflow recording module 108. As such, in various embodiments, user interface workflow recording module 108 may record a user interface workflow, and the user interface workflow may include and/or identify information, details, sources, and/or addresses of one or more webpages, one or more websites, and/or one or more URLs, including in a link of a webpage or website, whether selected or unselected within the web browser.

The instruction modules of the security extension may include test script generating module 110. Test script generating module 110 may be configured to generate, via the security extension, a test script that represents the user interface workflow. For example, when a defined session expires, the recorded user interface workflow may be used by test script generating module 110 to generate a test script that represents at least a portion of, or all of, the traffic recorded for the defined session in the web browser. In an embodiment, the term "traffic" refers to one or more requests and/or responses recorded for the workflow of the user interface within the test script. Traffic generally comprises a plurality of requests facilitated through the user interface and a plurality of responses served from an external server in response to the request(s). In embodiments, traffic is recorded by capturing request details that correspond to and/or were identified using one or more selected predefined options (e.g., "Solution Group" and "Solution Name"). The request details may include, for example, domain, port, protocol, path, method, argument name, and/or argument value. In some embodiments, the details may be captured in a specific format such as, for example, JSON format. Additionally, in some embodiments, traffic is captured and recorded including user interface changes and/or user interactions (e.g., events).

The traffic recorded may be used to generate at test script, in embodiments. The test script may be automatically generated by test script generating module 110 using one or more processors, in embodiments, without further or additional user input or intervention. In an embodiment, the test script is an executable script written in a computer programming language. In one embodiment, the test script is a java management extension (i.e., having a file extension of .JMX) script. The test script may be encrypted, in an embodiment. In some embodiments, once generated, the test script may be scheduled for execution, in an embodiment. Test script scheduling module 120 may be configured to schedule execution of the test script in an application, in some embodiments. The test script may include the traffic, such as the request details, user interface changes, and user interactions captured.

After the test script has been generated by test script generating module 110, test script execution module 112 of computing environment 100 may be configured to execute the test script in an application using a proxy port. A "proxy port" refers to a point of access for exchanging information via the Internet, for example, wherein the digital or virtual address of the port is utilized in place of the digital or virtual address of the device having the proxy port. For example, an Internet Protocol (IP) address that is specific to one port of a computing device is supplied as the identity for a connection to the Internet instead of using the "home" IP address of a computing device, and the port acts to connect the computing device to the Internet. In a further example, the port becomes a proxy port when the port serves as an intermediary that intercepts data and communications exchanged between the computing device (e.g., a client) and the Internet (e.g., a server). A computing device or computing system may have hundreds or thousands of ports. In one embodiment, proxy port 8080 is used within the application to execute the test script.

Executing the test script may result in recreating the user interface workflow that was recorded as the test script, in embodiments. In one embodiment, the test script is executed by test script execution module 112 using an application that connects to the Internet through a port, wherein that port is acting as a proxy port. For example, the test script may be executed by test script execution module 112 that operates as an application running locally on a desktop of a computing device, such as Apache™ JMeter™, and test script execution module 112 may use a proxy port, such as proxy port 8080, to acts as an intermediary between the test script execution module 112 and the Internet. In such an example, data and communications exchanged between the application running locally on the desktop and the Internet (e.g., a server) pass through port 8080 that servers as a proxy port. In embodiments, the application running locally on the desktop executes the test script in order to recreate the user interface workflow that was recorded, such that the traffic recorded and captured in the test script is "played back" via the application. For example, the proxy port is used by the application to send the recorded requests outward to the Internet (e.g., to a server providing Internet services) and to receive responses and provide those responses to the application. In some embodiments, executing the test script in the application using the proxy port may include generating a plurality of threads in the application. Each of the plurality of threads may correspond to a copy of the test script, in further embodiments. Executing the test script in the application using the proxy port may further include, in some embodiments, asynchronously (i.e., in parallel) executing the plurality of threads in the application.

Continuing, computing environment 100 may include a cyber-attack simulation module 114. In various embodiments, the cyber-attack simulation module 114 includes one or more applications or application programming interfaces (APIs) running locally on a desktop of a computing device. An example of such applications may include Apache™ JMeter™ and APIs such as Open Web Application Security Project (OWASP) Zed Attack Proxy (ZAP) Client API and a Representational State Transfer (REST) API. Accordingly, it will be understood from this description that the cyber-attack simulation module 114 may operate in cooperation with or in tandem with test script execution module 112, and/or may operate within test script execution module 112 itself. Accordingly, the test script execution module 112 and cyber-attack simulation module 114 may be used together to execute, for example, a ZAP Client API, a ZAP REST API, and/or Apache™ JMeter™. Cyber-attack simulation module 114 may be configured to, when executed, set up an environment for performing a simulated cyber-attack, and further, simulate a cyber-attack against the user interface workflow, as recreated via execution of the test script. For example, when setting up an environment for performing a simulated cyber-attack, the cyber-attack simulation module 114 may be used to execute a ZAP Client API that is configured to access a ZAP REST API. In one such example, the ZAP Client API and ZAP REST API may be configured to operate using a daemon mode until the simulated cyber-attach is completed, at which time the daemon mode is closed.

The cyber-attack simulation module 114 may execute the test script using an application or API, in one or more embodiments. In one embodiment, the test script may be executed using Apache™ JMeter™ on a ZAP proxy port. Simulating a cyber-attack against the recreated user interface workflow may include intercepting traffic generated from the test script, for example, based on execution of the test script. In embodiments, cyber-attack simulation module 114 simulates a cyber-attack against the recreated user interface workflow, wherein simulation of the cyber-attack may include crawling the test script to locate one or more URLs. As used herein, "crawling" refers to a computer process that follows links (e.g., URLs) in a webpage or website, retrieves or fetches the content from the webpage, website, or other location located by following the links, and stores the content, for example, transiently or permanently, in memory (e.g., such as electronic storage 130). For example, cyber-attack simulation module 114 may crawl the test script, wherein during crawling, each of a plurality of links is located, identified, extracted, and/or is followed, through the proxy port. In one such example, cyber-attack simulation module 114 crawls the test script, wherein during crawling, for each of the plurality of links in the test script, content is extracted from the location of the followed or extracted link and may be stored.

In some embodiments, cyber-attack simulation module 114 simulates a cyber-attack against the recreated user interface workflow by spidering the one or more URLs found in the test script, based on crawling of the test script. As used herein, "spidering" refers to a computer process that builds a map of the links and points of access within an application, such as the recreated user interface workflow, for security testing. In embodiments, the URLs that were crawled are subsequently spidered by cyber-attack simulation module 114. Cyber-attack simulation module 114 simulates a cyber-attack against the recreated user interface workflow by scanning one or more URLs in the test script, in embodiments. As used herein, "scanning" refers to an active scan of the one or more URLs that have been spidered, wherein the active scan recognizes one or more known security vulnerability and/or cyber-attacks. The spidering of one or more URLs produces one or more URLs that are recognized to be potential targets for a cyber-attack, and the one or more target URLs are scanned, in various embodiments. In further embodiments, cyber-attack simulation module 114 simulates a cyber-attack by intercepting all traffic that is generated from execution of the test script in the application, by crawling the test script to locate one or more URLs, by spidering one or more URLs located in the test script, and by actively scanning one or more URLs that have been spidered. In such embodiments, cyber-attack simulation module 114 finds all the URLs that are present in the test script and/or recreated user interface workflow, attacks all of the URLs, then scans all of the URLs to identify whether the attacks were able to penetrate the test script and/or the recreated user interface workflow (i.e., attack was successful). For those URLs that were penetrated by the attack(s), a security vulnerability may be identified as associated with said URLs.

Security vulnerability identifying module 116 may be configured to identify a security vulnerability based on the cyber-attack. For example, security vulnerability identifying module 116 may, based on the crawling, spidering, and/or scanning aspects discussed above, identify that a particular URL is associated with a particular security vulnerability. Examples of security vulnerabilities include web browser protection not enabled, header not set, header missing, and the like. A security vulnerability may be preconfigured or predefined within the computing environment 100, such that security vulnerability identifying module 116 can reference the electronic storage 130 that stores criteria and/or definitions for security vulnerabilities and uses said information to recognize various security vulnerabilities based on the output of the cyber-attack simulation module 114.

Security report generating module 118 may be configured to generate a security report that identifies the security vulnerability. For example, security report generating module 118 may generate a security report to be displayed via user interface, wherein the security report specifically identifies each URL that is associated with one or more security vulnerabilities, and specifically identifies the particular one or more security vulnerabilities or type(s) of security vulnerabilities that have been identified for each URL by security vulnerability identifying module 116. For example, a first URL may be displayed in a security report in a graphical user interface with a graphic, an icon, a symbol, and/or text notation identifying the first URL and identifying that the first URL is associated with a first security vulnerability. In a further example, a second URL may be displayed in a security report in a graphical user interface with a graphic, an icon, a symbol, and/or text notation identifying the second URL and identifying that the second URL is associated with a second security vulnerability. Once a security report is generated, the security report may be stored. In some embodiments, a database population module 122 may be configured to automatically populate a database, such as electronic storage 130, with the security report.

Having described computing environment 100 and components thereof, it will be understood by those of ordinary skill in the art that computing environment 100 is but one example of a suitable system and is not intended to limit the scope of use or functionality of the present invention. Similarly, computing environment 100 should not be interpreted as imputing any dependency and/or any requirements with regard to each component and combination(s) of components illustrated in FIG. 1. It will be appreciated by those of ordinary skill in the art that the location of components illustrated in FIG. 1 is an example, as other methods, hardware, software, components, and devices for establishing a communication links between the components shown in FIG. 1 may be utilized in implementations of the present invention. It will be understood to those of ordinary skill in the art that the components may be connected in various manners, hardwired or wireless, and may use intermediary components that have been omitted or not included in FIG. 1 for simplicity's sake. As such, the absence of components from FIG. 1 should be not be interpreted as limiting the present invention to exclude additional components and combination(s) of components. Moreover, though components are represented in FIG. 1 as singular components, it will be appreciated that some embodiments may include a plurality of devices and/or components such that FIG. 1 should not be considered as limiting the number of a device or component.

Figure 2:
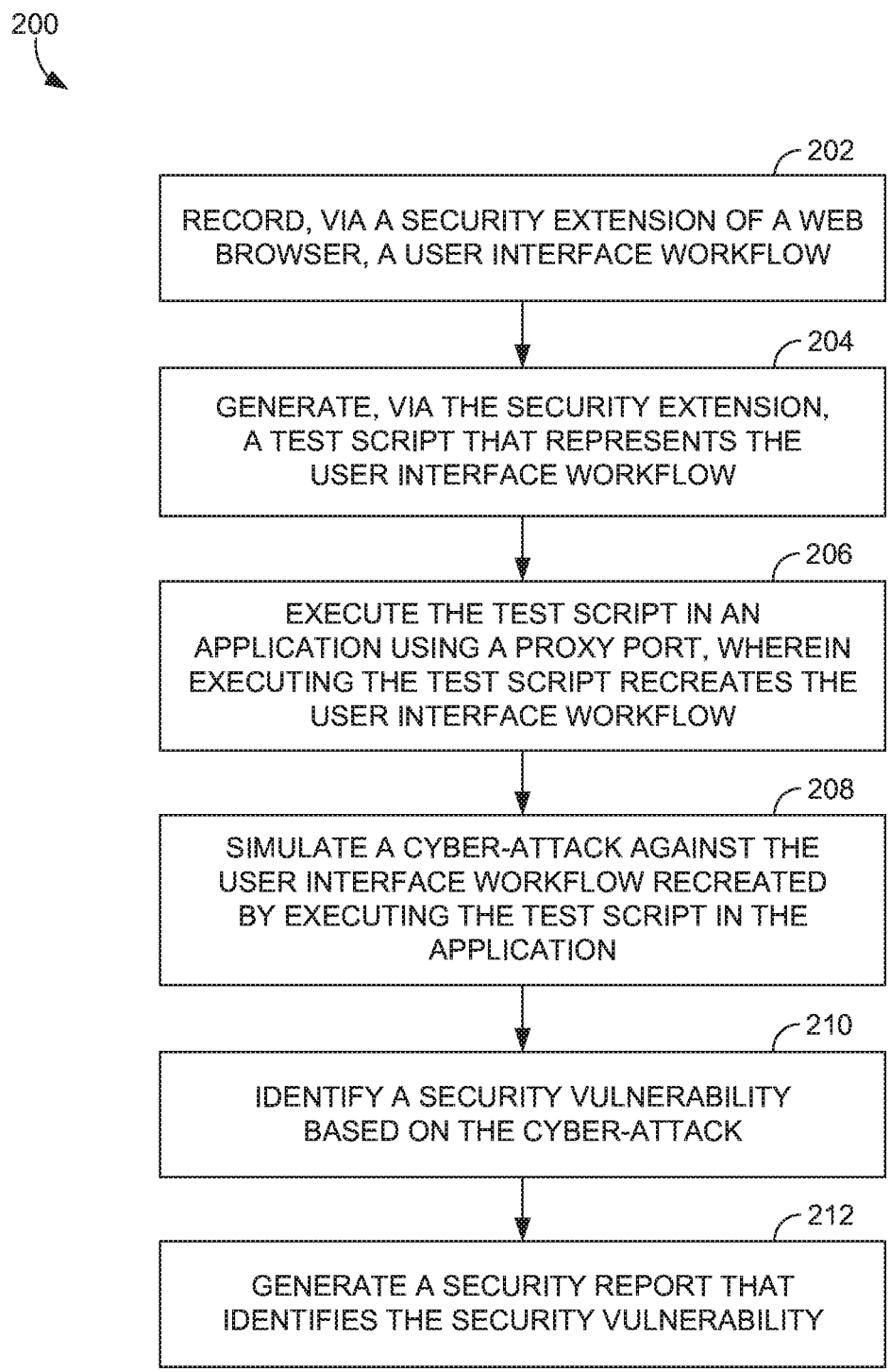
FIG. 2 illustrates a method for conducting security penetration testing, in accordance with one or more implementations.
Figure 3:
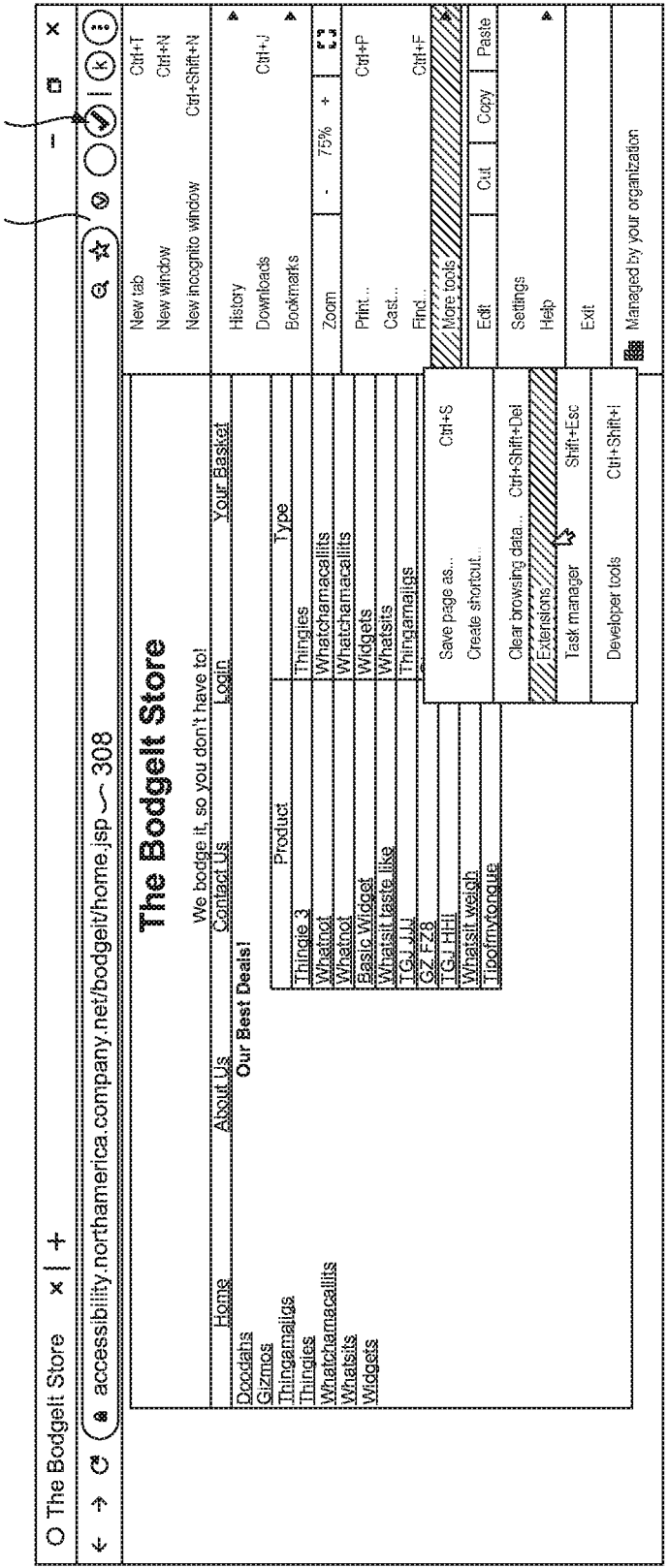
FIG. 3 illustrates an example graphical user interface in a web browser with a security extension, in accordance with one or more implementations.
Figure 4:
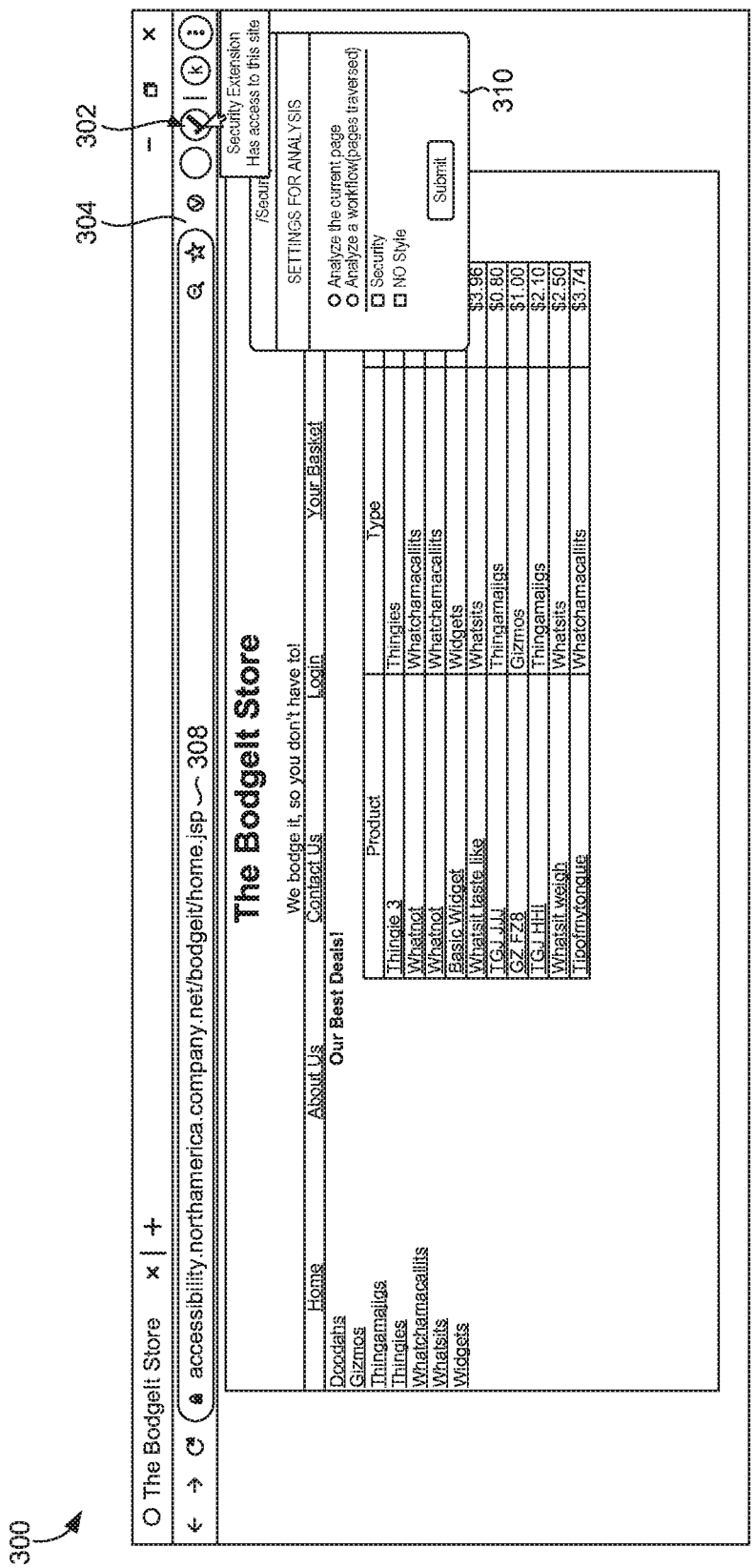
FIG. 4 illustrates an example graphical user interface in a web browser with a security extension, in accordance with one or more implementations.

Turning now to FIG. 2, a method is illustrated for conducting security penetration testing, in accordance with one or more implementations. The operations of the methods presented below are intended to be illustrative. In some implementations, the methods may be accomplished with one or more additional operations not described, and/or without one or more of the operations discussed. Additionally, the order in which the operations of the methods are illustrated in FIGS. 2 through 4 and described below is not intended to be limiting.

Additionally, the method of FIG. 2 may be performed via one or more of the components and component interactions previously described in FIG. 1 and later described in FIG. 22. As such, the methods are discussed briefly for brevity, though it will be understood that the previous discussion can be applicable to aspects of the method of FIG. 2. In various embodiments, one or more non-transitory computer-readable storage media having computer-readable instructions or computer-readable program code portions embodied thereon, for execution via one or more processors, may be executed to implement and/or perform one or more of the method shown in FIG. 2. For example, computer-readable instructions or computer-readable program code portions can specify the performance of the methods, can specify a sequence of steps of the methods, and/or can identify particular component(s) of a software and/or hardware for performing one or more of the steps of the methods, in embodiments. The computer-readable instructions or computer-readable program code portions can correspond to an application plugin or an application programming interface (API), in some embodiments. In one embodiment, the plugin or API can implement and/or perform the methods. As discussed below, the methods can be performed using any and all of the software, hardware, component(s), and/or device(s) shown in FIGS. 1 and 22.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

FIG. 2 illustrates method 200, in accordance with one or more implementations. In some embodiments, prior to recording the user interface workflow, the method 200 may comprise loading the security extension in the web browser. For example, one or more indications of user input may be received, wherein the user input includes selections for loading the security extension into the web browser. In some embodiments, a computing device can include a security extension loading module, such as security extension loading module 124 of computing environment 100 of FIG. 1, that can load the security extension in the web browser. As such, loading the security extension in the web browser may be performed by one or more hardware processors configured by machine-readable instructions including a module that is the same as or similar to security extension loading module 124, in accordance with one or more implementations. FIG. 3 illustrates a graphical user interface 300 for loading a security extension in a web browser.

In some embodiments, prior to recording the user interface workflow, the security extension can be enabled in the web browser using one or more parameters. For example, one or more indications of user input may be received, wherein the user input includes one or more parameters. The one or more parameters may be used to configure the security extension, in some embodiments. In embodiments, a computing device can include a security extension enabling module, such as security extension enabling module 126 of computing environment 100 of FIG. 1, that can enable the security extension that is loaded in the web browser using one or more parameters. In some embodiments, the loaded security extension may be enabled in the web browser by one or more hardware processors configured by machine-readable instructions including a module that is the same as or similar to security extension enabling module 126, in accordance with one or more implementations. FIG. 4 illustrates the example of a graphical user interface 300 for enabling a security extension in a web browser. For example, in the graphical user interface 300 of FIG. 4, one or more graphical objects, such as icon 302, may be displayed in a toolbar 304 of a currently displayed tab in a window of a web browser, wherein the icon 302 is selectable to enable to security extension within the browser. The graphical user interface 300 may further display a web address 308. Additionally, the graphical user interface 300 may display a popup window 310 for enabling the security extension, in addition to the icon 302. Later, the security extension may be disabled based on receipt of a user indication to pause, stop, or terminate recording of the user interface workflow. For example, the icon 302 may be selected to disable the security extension within the browser.

Figure 5:
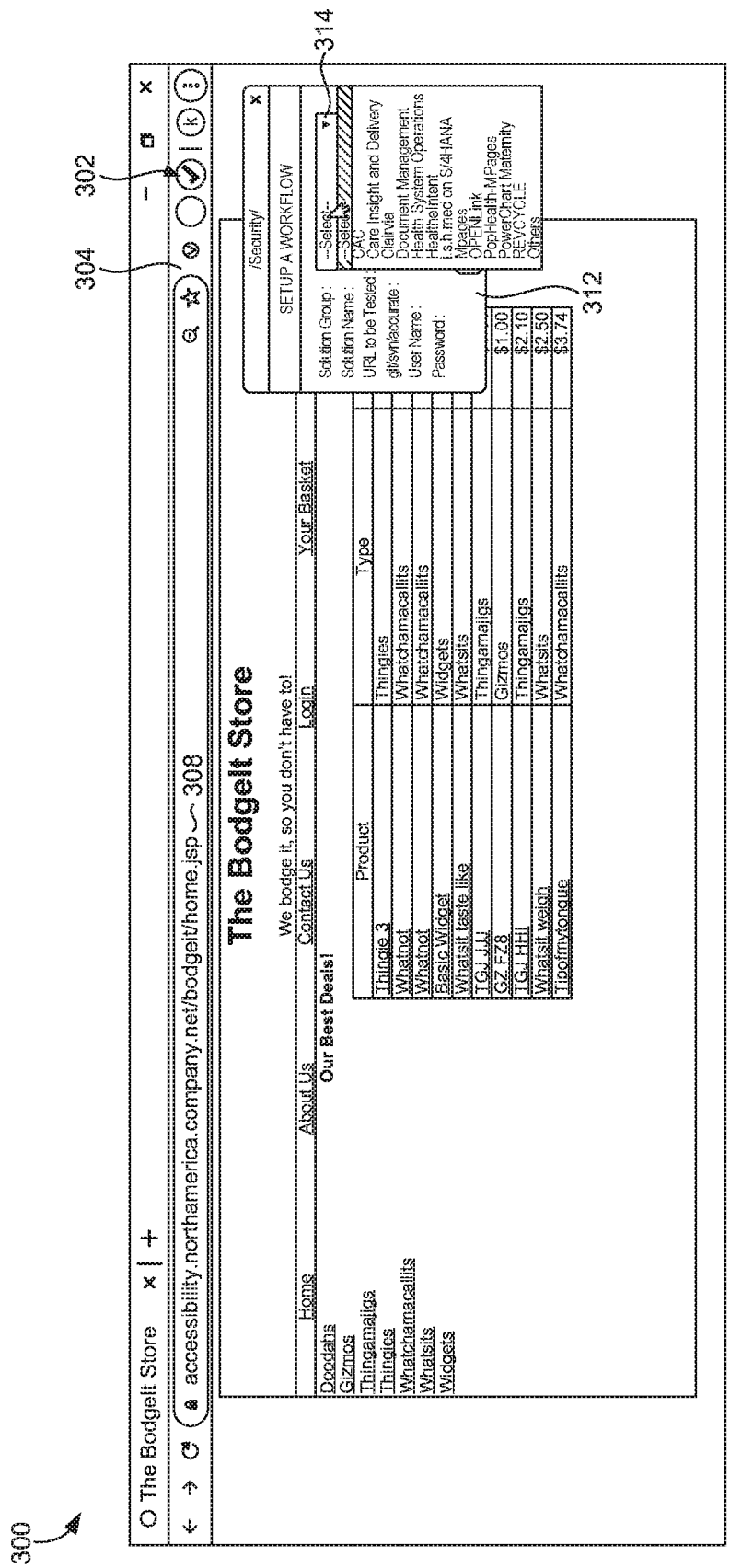
FIG. 5 provides a detail view of an example graphical user interface in a web browser with a security extension, in accordance with one or more implementations.
Figure 6:
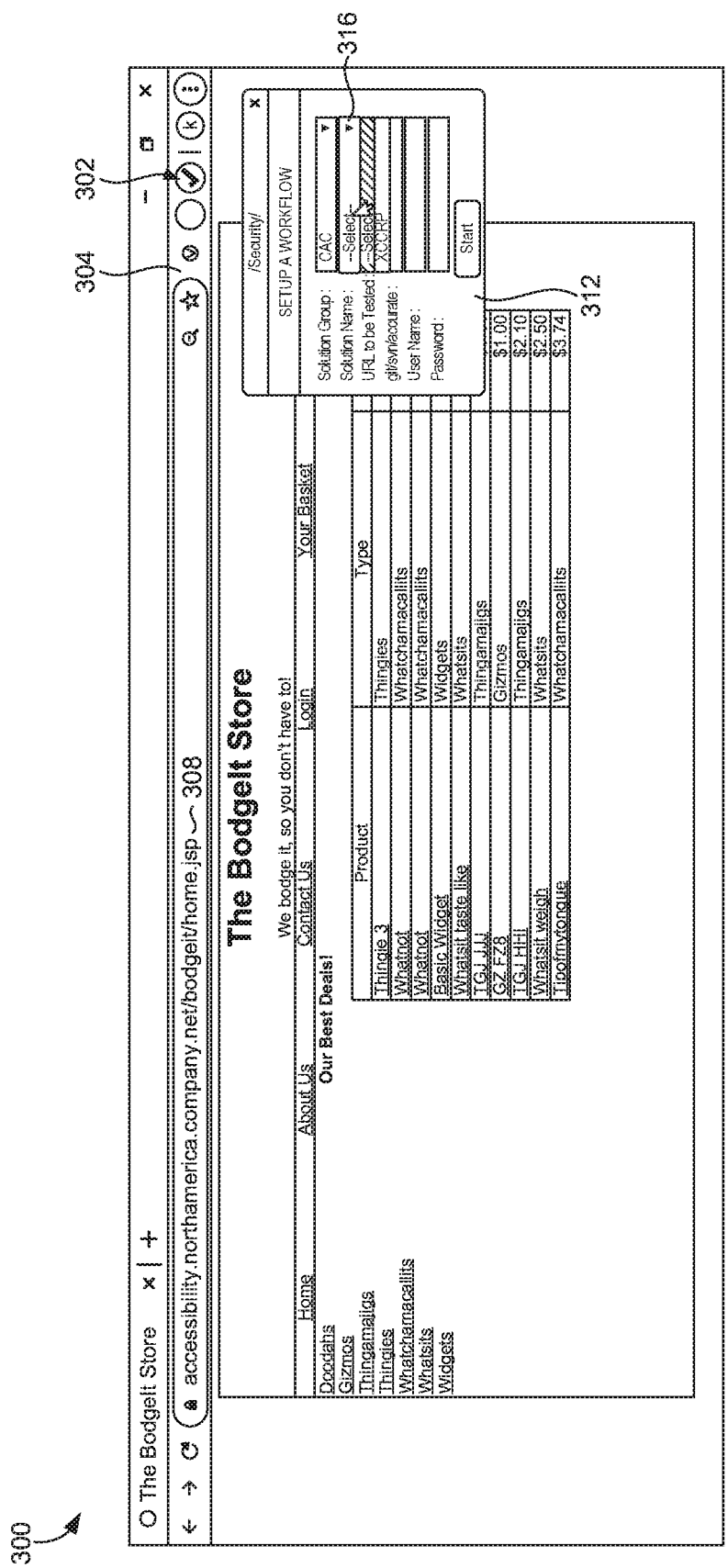
FIG. 6 provides a detail view of an example graphical user interface in a web browser with a security extension, in accordance with one or more implementations.
Figure 7:
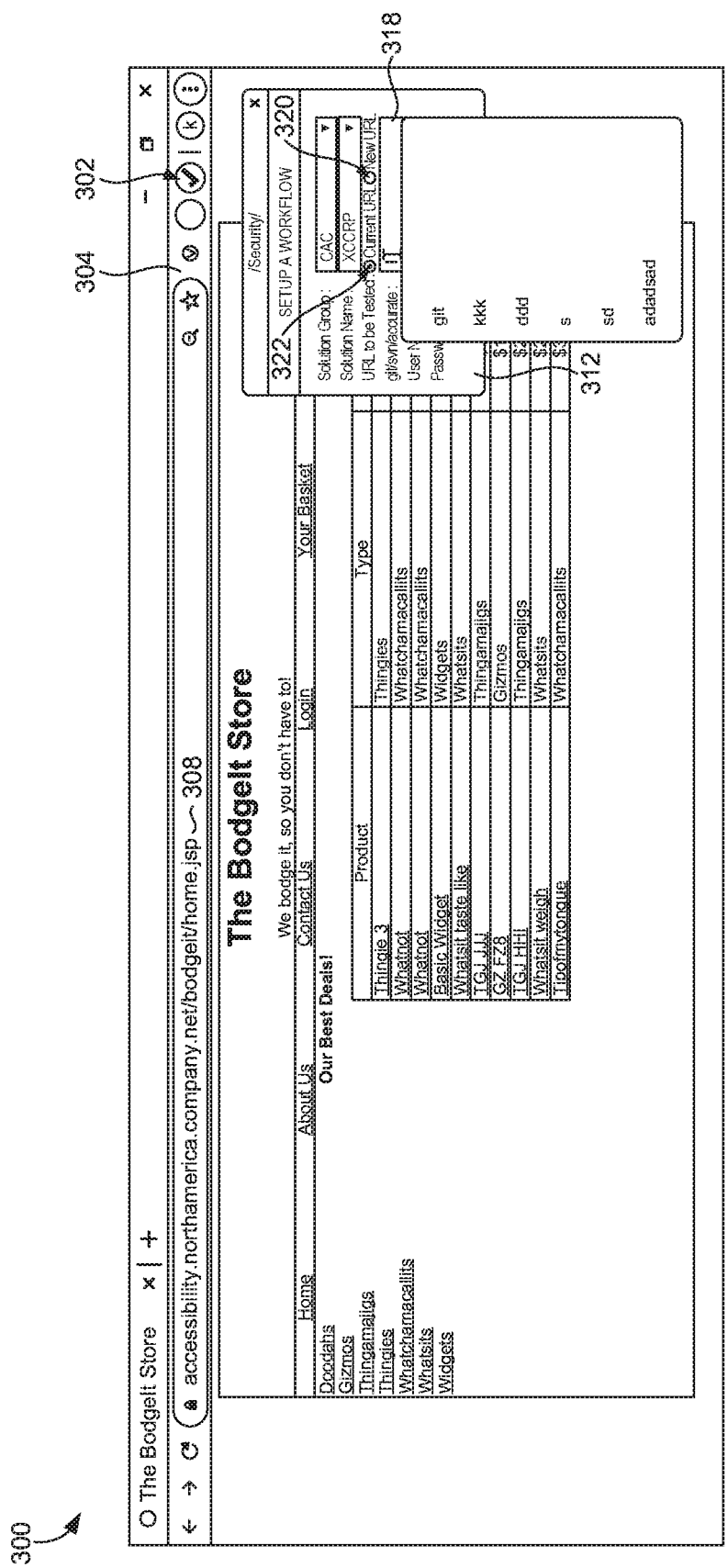
FIG. 7 provides a detail view of an example graphical user interface in a web browser with a security extension, in accordance with one or more implementations.
Figure 8:
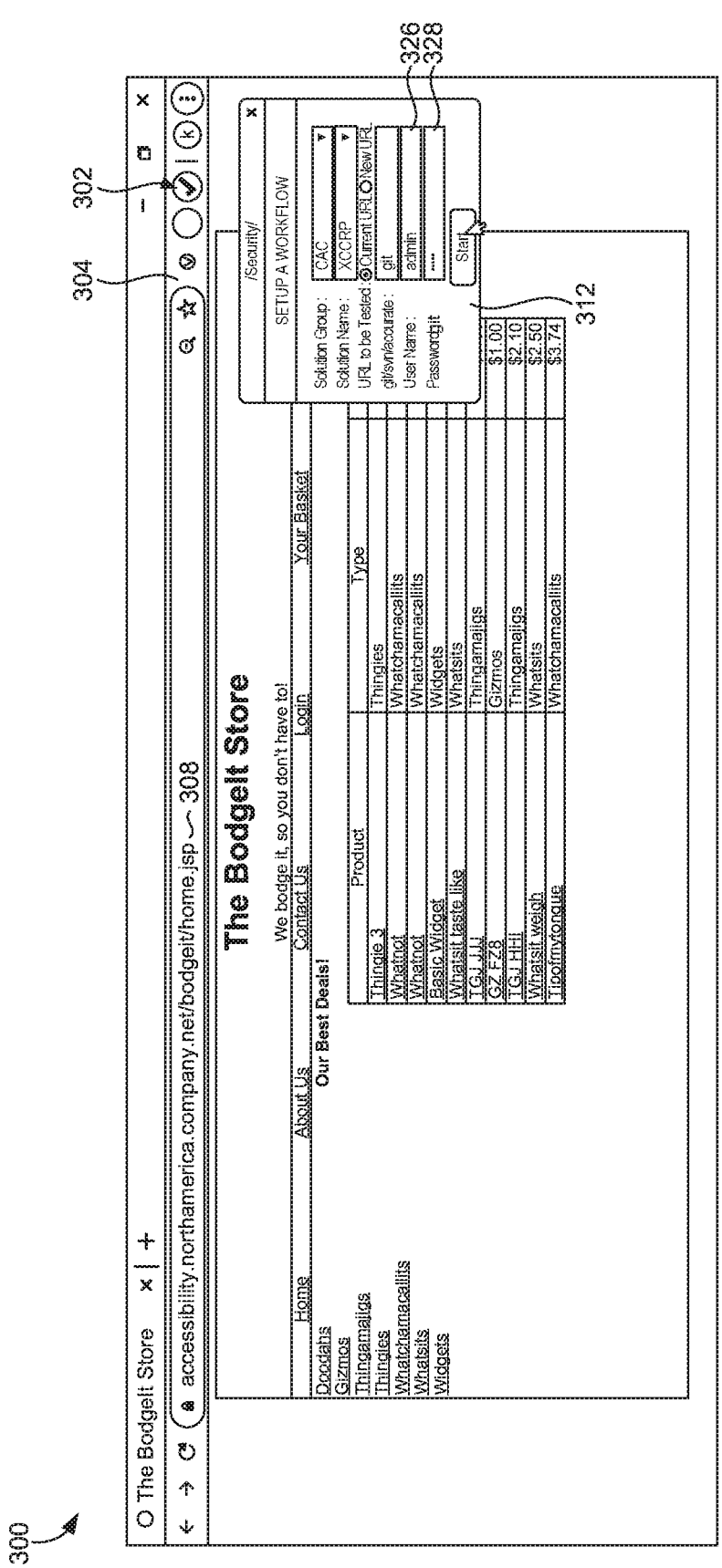
FIG. 8 provides a detail view of an example graphical user interface in a web browser with a security extension, in accordance with one or more implementations.

Once the security extension is loaded and/or enabled within the web browser, one or more parameters may be input, for example, via user input and selection or automatically by a processor. FIG. 5 illustrates a detailed view of a graphical user interface having a pop-up window 312 with one or more selectable options being displayed for the entry of one or more parameters to be used to configure the security extension. As shown in the example of FIG. 5, a first drop-down menu may be displayed, wherein the first drop-down menu includes one or more selectable predefined options for a first "solution group" 314. Further, in the example of FIG. 6, a second drop-down menu may be displayed, wherein the second drop-down menu includes one or more selectable predefined options for a "solution name" 316. In the example of FIG. 7, a third drop-down menu may be displayed, wherein the third drop-down menu includes one or more selectable predefined options for a VCS 318. Additionally, in FIG. 7, one or more selectable graphical objects may be used to identify and/or select a particular webpage for which a user interface workflow is to be recorded for testing, such as for example, a selectable bullet for specifying a "New URL" 320 and/or identifying a "Current URL" 322. A "Current URL" 322 selection may correspond to a particular URL that is currently displayed in the web browser, such as graphical user interface 300 of FIG. 4 (e.g., "BodgeIt Store"). Finally, as illustrated in the example of FIG. 8, one or more input fields 326 and 328 or input "boxes" may be displayed, and configured for user input. For example, an indication of a user identity and password may be input to one or more of the input fields as a parameter for enabling the security extension. Based on indications received that include one or more parameters, the security extension may be configured in various embodiments.

Figure 9:
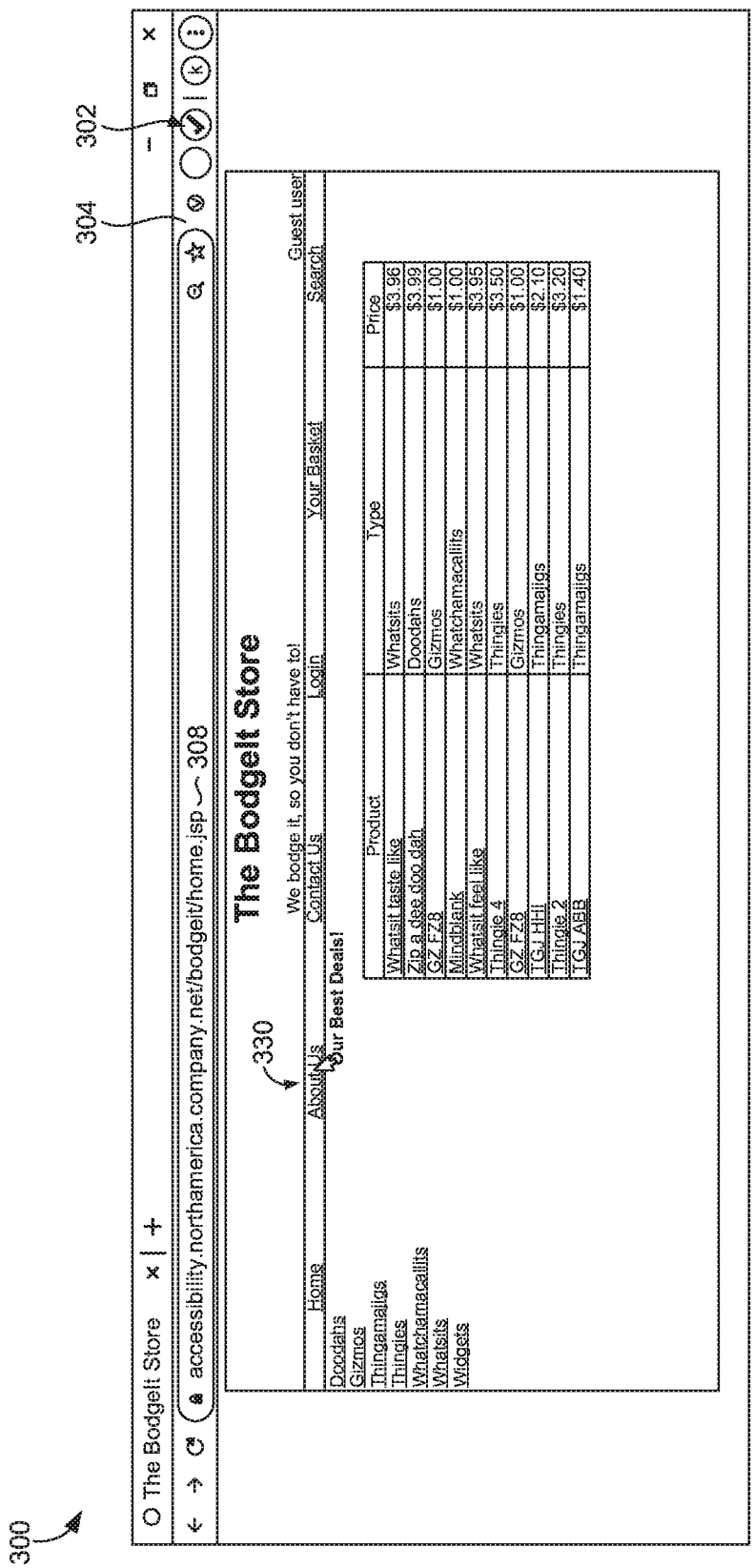
FIG. 9 illustrates an example graphical user interface for recording a user interface workflow, in accordance with one or more implementations.
Figure 10:
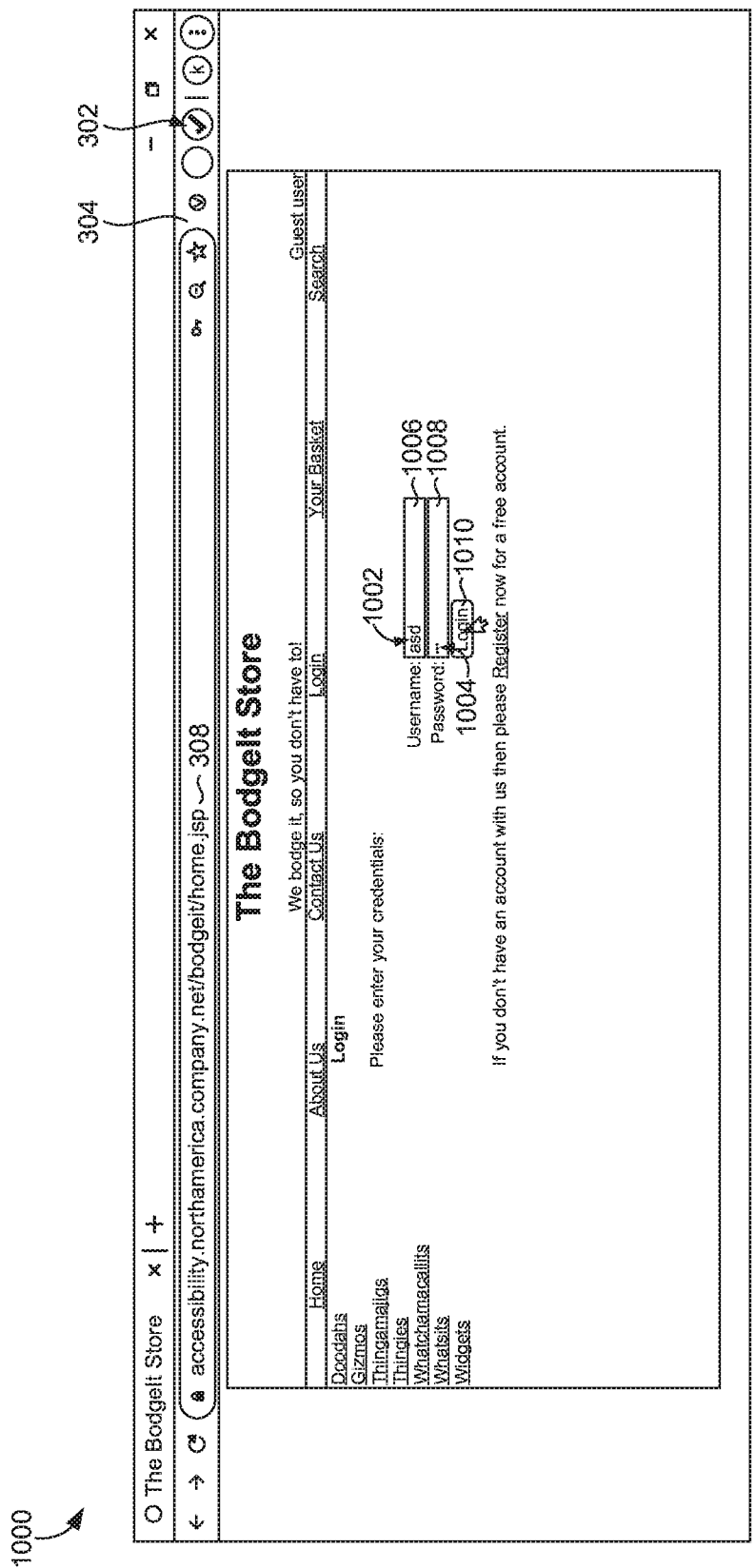
FIG. 10 illustrates an example graphical user interface for recording a user interface workflow, in accordance with one or more implementations.
Figure 11:
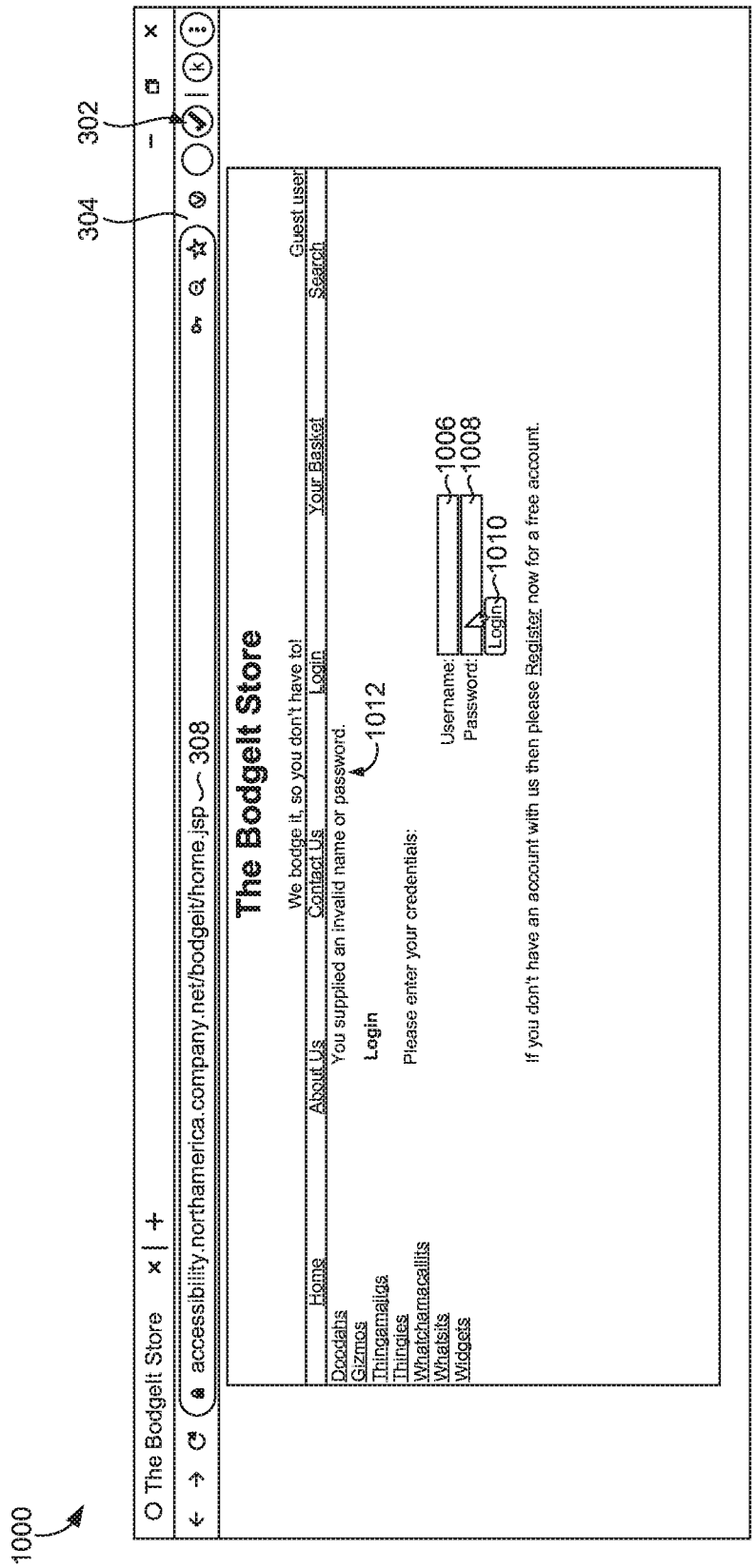
FIG. 11 illustrates an example graphical user interface for recording a user interface workflow, in accordance with one or more implementations.

Subsequent to one or more parameters having been specified by user input or automatically selected, for example, one or more user interactions via the web browser can be recorded in order to capture the testing of a website, webpage, links, and/or functionalities thereof, such as the example graphical user interface 300 shown in FIG. 4 that corresponds to the web address 308 shown. As such, at block 202, a user interface workflow is recorded via a security extension of a web browser. In embodiments, input and/or generated data and information resulting from engagement of functionalities that was recorded while the security extension is enabled is recorded. In various embodiments, all traffic, all data from interactions, and all input associated with the web browser while the security extension is enabled is recorded. Accordingly, the recording, once completed, can provide a complete record of the user interface workflow, e.g., which links were selected, which tabs were viewed, what webpages were displayed, what login information was provided, and/or what requests were sent from the web browser to a server. FIG. 9, for example, illustrates the graphical user interface 300 being recorded, wherein an indication can be received when a link, such as "About Us" 330 is selected and used to navigate to another webpage within the web browser, and the indication, request, and later response may be recorded. In the graphical user interface 1000 shown in FIGS. 10 and 11, information and the performance of a functionality may be recorded as the user interface workflow, such as a user identity 1002 and password 1004 input to fields 1006 and 1008, respectively, in order to test a login functionality, a selectable button 1010 for submitting the information, and the outcome of that functionality (e.g., "You supplied an invalid name or password" 1012). In some embodiments, a computing device can include a user interface workflow recording module, such as user interface workflow recording module 108 of computing environment 100 of FIG. 1, that can record, via a security extension of a web browser, a user interface workflow. Accordingly, block 202 may be performed by one or more hardware processors configured by machine-readable instructions including a module that is the same as or similar to user interface workflow recording module 108, in accordance with one or more implementations.

Figure 12:
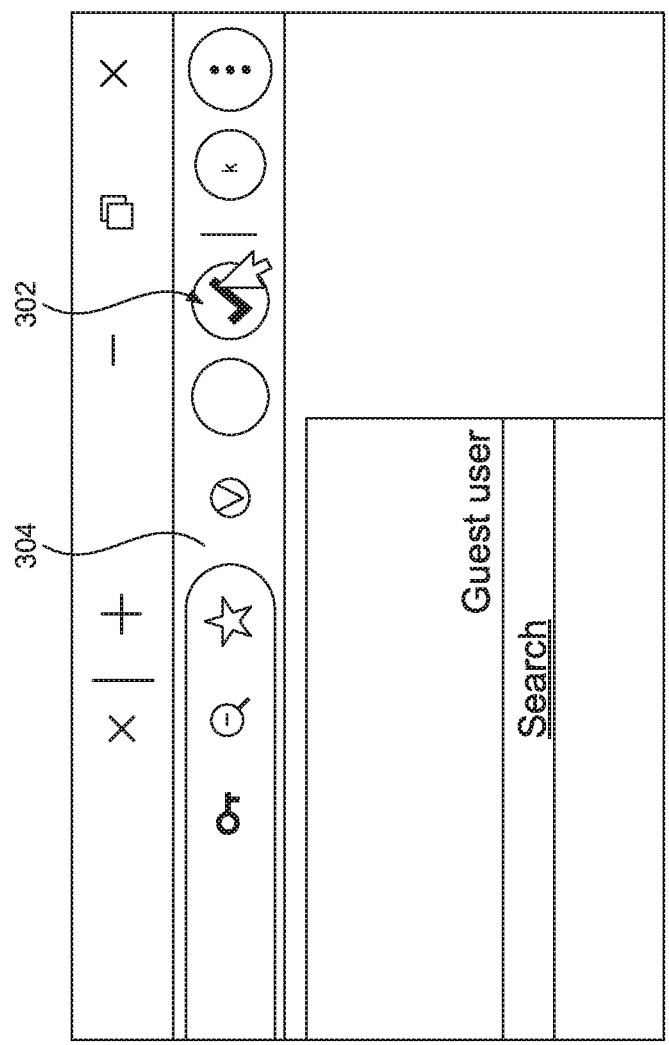
FIG. 12 provides a detail view of an example graphical user interface for recording a user interface workflow, in accordance with one or more implementations.

A user indication may be received that indicates the recording of the user interface workflow by the security extension may be complete or terminated, for example. For example, as shown in FIG. 12, one or more graphical objects, such as icon 302, may be displayed in a toolbar 304 of a web browser, wherein the icon 302 is selectable to disable the security extension within the browser, and/or may be selectable to provide an indication that recording of the user interface workflow is complete or to be terminated.

When recording is completed or terminated, a test script may be generated as a record of at least a portion, or all, traffic, requests, responses, input, selections, data, information, and/or functionalities tested in the web browser, referred to herein as the user interface workflow. Thus, at block 204 of FIG. 2, via the security extension, a test script is generated that represents the user interface workflow. Based on the recording, the test script encodes one or more requests sent and responses received as a result of user interactions with one or more webpages, websites, links, and/or functionalities in the web browser while the security extension was enabled, in embodiments. The test script encodes, in embodiments, input and/or generated data and information resulting from engagement of functionalities that was recorded while the security extension was enabled. In various embodiments, all traffic, all data from interactions, and all input associated with the web browser while the security extension was enabled are encoded in the test script. Accordingly, the test script provides a complete record of the user interface workflow, e.g., which links were selected, which tabs were viewed, what webpages were displayed, what login information was provided, and/or what requests were sent from the web browser to a server. In some embodiments, a computing device can include a test script generating module, such as test script generating module 110 of computing environment 100 of FIG. 1, that can generate a test script that represents the user interface workflow. Therefore, block 204 may be performed by one or more hardware processors configured by machine-readable instructions including a module that is the same as or similar to test script generating module 110, in accordance with one or more implementations. The generated test script may be stored locally or remotely for later retrieval, in embodiments. For example, the test script may be stored, and may be later retrieved for scheduling and/or testing, as shown in the example graphical user interface 1300 in the web browser of FIG. 13. For each test script generated, a "Run status" (e.g., "Not Completed" 1302) may be displayed to indicate whether penetration testing of a test script has or has not been performed, as illustrated in the example graphical user interface 1300 in the web browser of FIG. 13. For each test script generated, a "Schedule Status" (e.g., "Not Scheduled" 1304) may be displayed to indicate whether penetration testing of a test script has or has not been scheduled for testing, as illustrated in the example graphical user interface 1300 in the web browser of FIG. 13.

Figure 13:
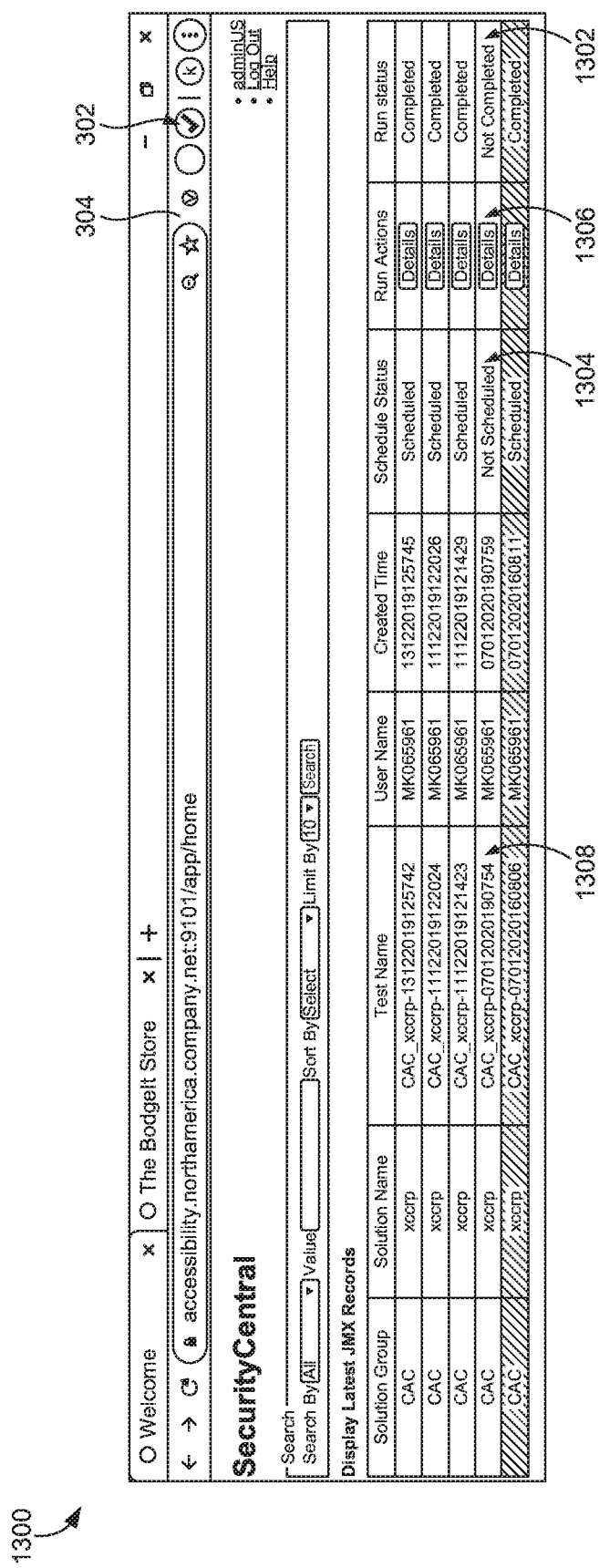
FIG. 13 illustrates an example graphical user interface that displays test scripts, in accordance with one or more implementations.
Figure 15:
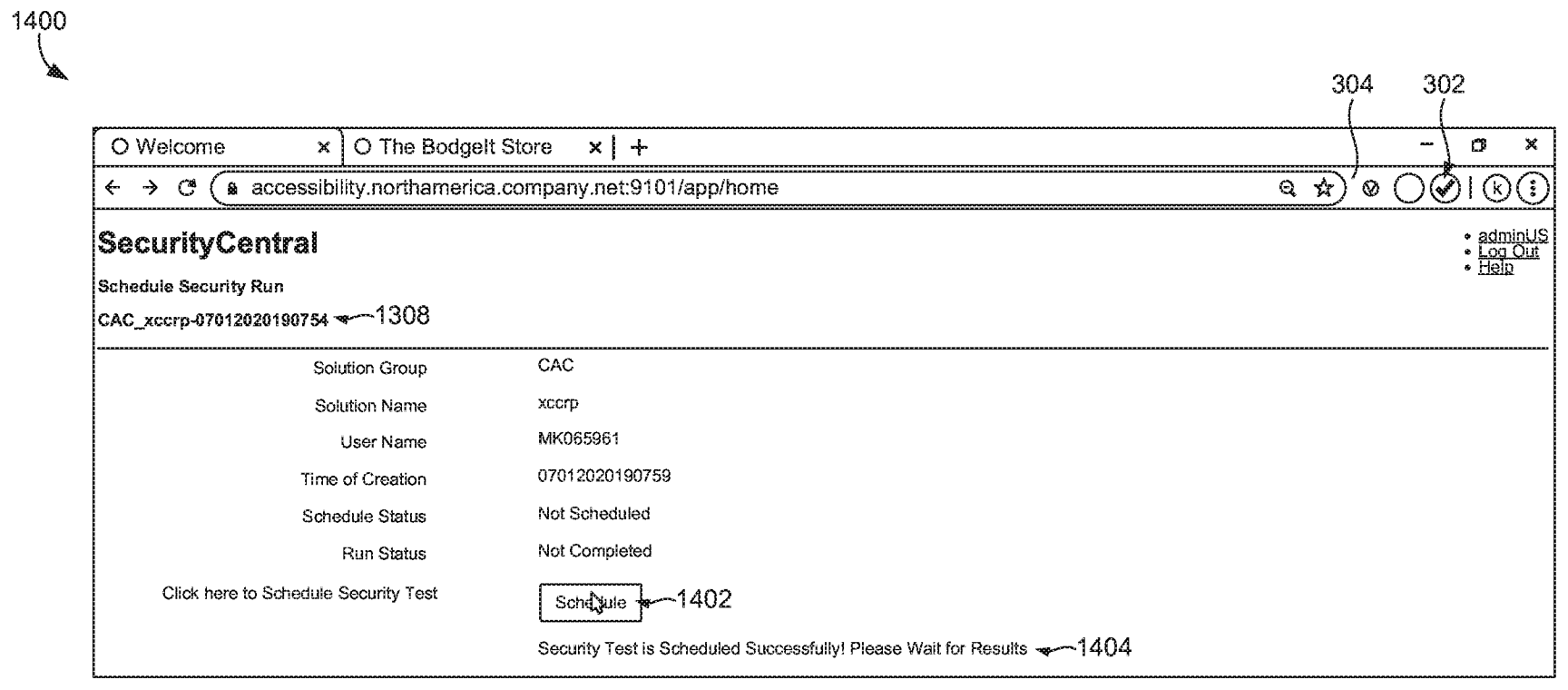
Figure 19:
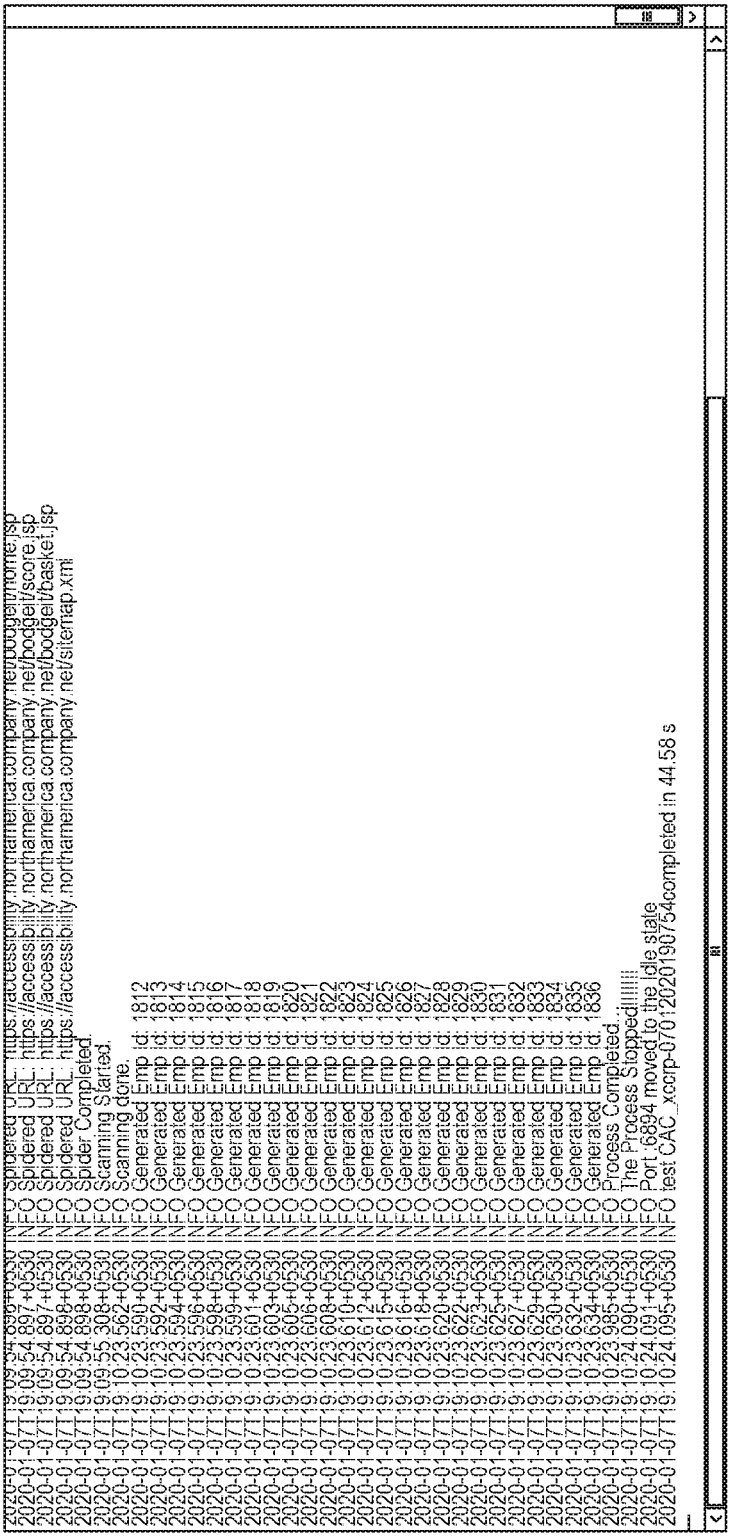
FIG. 19 illustrates an example of the execution of a test script displayed as running computer programming code, in accordance with one or more implementations.

In some embodiments, subsequent to generation, the test script may be scheduled for execution within the application. Thus, in embodiments, one or more test scripts may be scheduled for penetration testing at a later time and date, and/or penetration testing of one or more test scripts may be performed in a batched manner. In embodiments, a graphical object may be selected that corresponds to a particular test script and may navigate a user to a new graphical user interface where the new user interface provides additional details regarding the particular selected test script and a functionality for scheduling penetration testing of that particular selected test script. In FIG. 13, button 1306 "Details" in graphical user interface 1300 may be selected in order to select a particular test script (e.g., test script named "CAC_xccrp_07012020190754" 1308). In response to selection of button 1306 "Details" in the graphical user interface 1300 for a particular test script (e.g., test script named "CAC_xccrp_07012020190754" 1308), a user is navigated to graphical user interface 1400, which provides a button 1402 "Schedule," as shown in FIG. 14. In response to a selection of button 1402, a visual confirmation of scheduling may be presented in the graphical user interface 1400, as shown in FIG. 15 (e.g., "Security Test is Scheduled Successfully!" 1404). In one embodiment, a computing device can include a test script scheduling module, such as test script scheduling module 120 of computing environment 100 of FIG. 1, that can schedule execution of the test script. For this reason, scheduling may be performed by one or more hardware processors configured by machine-readable instructions including a module that is the same as or similar to test script scheduling module 120, in accordance with one or more implementations.

The test script may be executed in an application using a proxy port, as shown at block 206. Executing the test script may recreate the user interface workflow within the application and/or web browser, in some embodiments. For example, because the test script encodes a complete record of the user interface workflow that was recorded, the user interface workflow can be recreated by executing the test script, e.g., which links were selected, which tabs were viewed, what webpages were displayed, what login information was provided, and/or what requests were sent from the web browser to a server. In one particular embodiment, the test script may be executed, for example, within a ZAP proxy port using Apache™ JMeter™. In an embodiment, a computing device can include a test script execution module, such as test script execution module 112 of computing environment 100 of FIG. 1, that can execute the test script in an application using a proxy port. Accordingly, block 206 may be performed by one or more hardware processors configured by machine-readable instructions including a module that is the same as or similar to test script execution module 112, in accordance with one or more implementations.

At block, 208 a cyber-attack is simulated against the user interface workflow that is recreated by executing the test script in the application. In some embodiments, a computing device can include a cyber-attack simulation module, such as cyber-attack simulation module 114 of computing environment 100 of FIG. 1, that can simulate a cyber-attack against the recreated user interface workflow. Therefore, block 208 may be performed by one or more hardware processors configured by machine-readable instructions including a module that is the same as or similar to cyber-attack simulation module 114, in accordance with one or more implementations.

Figure 20:
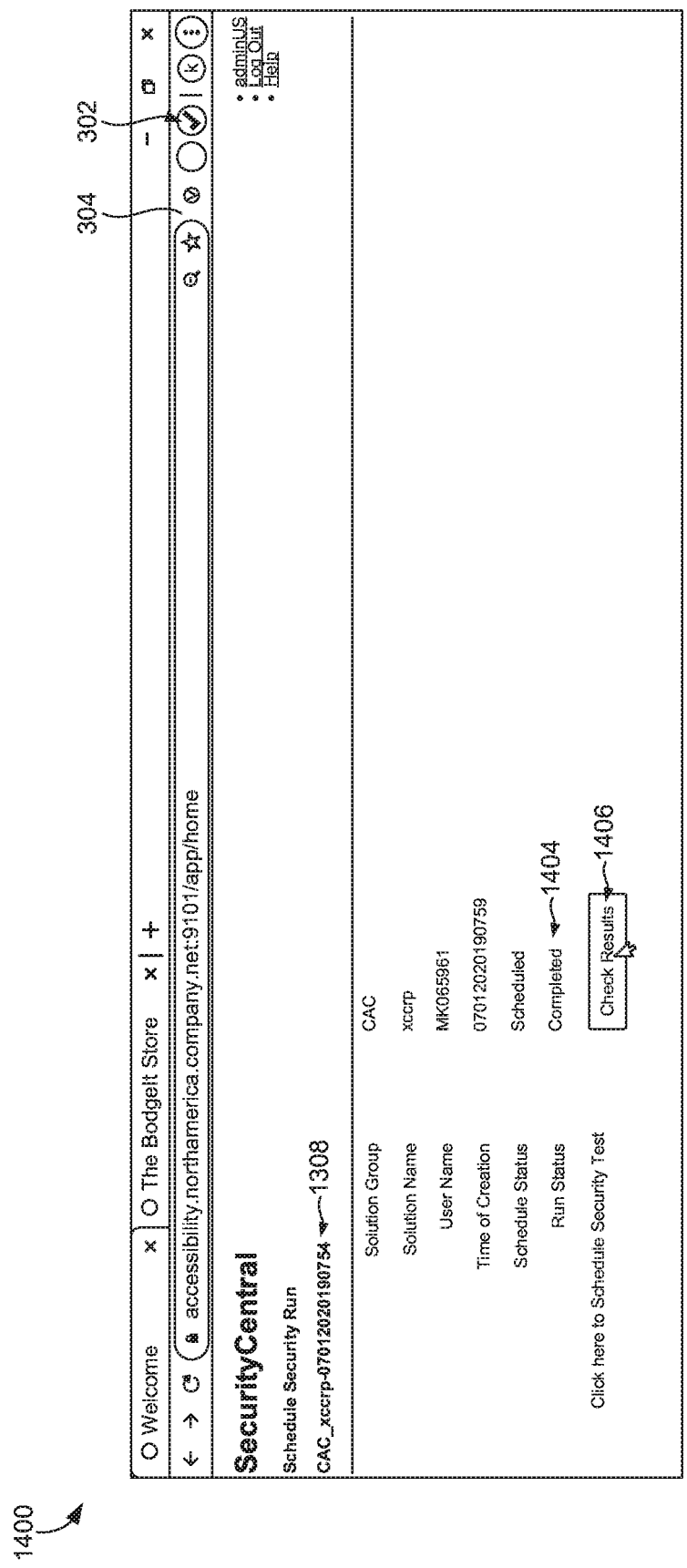
FIG. 20 illustrates an example graphical user interface for retrieving a security report, in accordance with one or more implementations.

In some embodiments, a cyber-attack is simulated by performing one or more of intercepting all traffic that is generated from execution of the test script in the application, by crawling the test script to locate one or more URLs, by spidering the one or more URLs in the test script, and/or by actively scanning the one or more URLs, as previously described. In such embodiments, all the URLs that are present in the test script and/or recreated user interface workflow are located, spidered, and actively scanned in order to identify whether the URLs were penetrated by the attack. Each of FIGS. 16-19 provide examples of an application executing a test script in order to recreate the user interface workflow and perform a penetration test against the recreated user interface workflow. For those URLs that were penetrated by the attack(s), a security vulnerability may be identified as associated with said URLs. FIG. 20 illustrates an example of the graphical user interface 1400 that may display an indication that a cyber-attack simulation is completed, wherein the graphical user interface 1400 displays a Run Status of "Completed" 1404 and a selectable button 1406 "Check Results."

A security vulnerability may be identified based on the cyber-attack simulation, at block 210. In some embodiments, a computing device can include a security vulnerability identifying module, such as security vulnerability identifying module 116 of computing environment 100 of FIG. 1, that can identify a security vulnerability based on the cyber-attack simulation. As such, block 210 may be performed by one or more hardware processors configured by machine-readable instructions including a module that is the same as or similar to security vulnerability identifying module 116, in accordance with one or more implementations.

Figure 21:
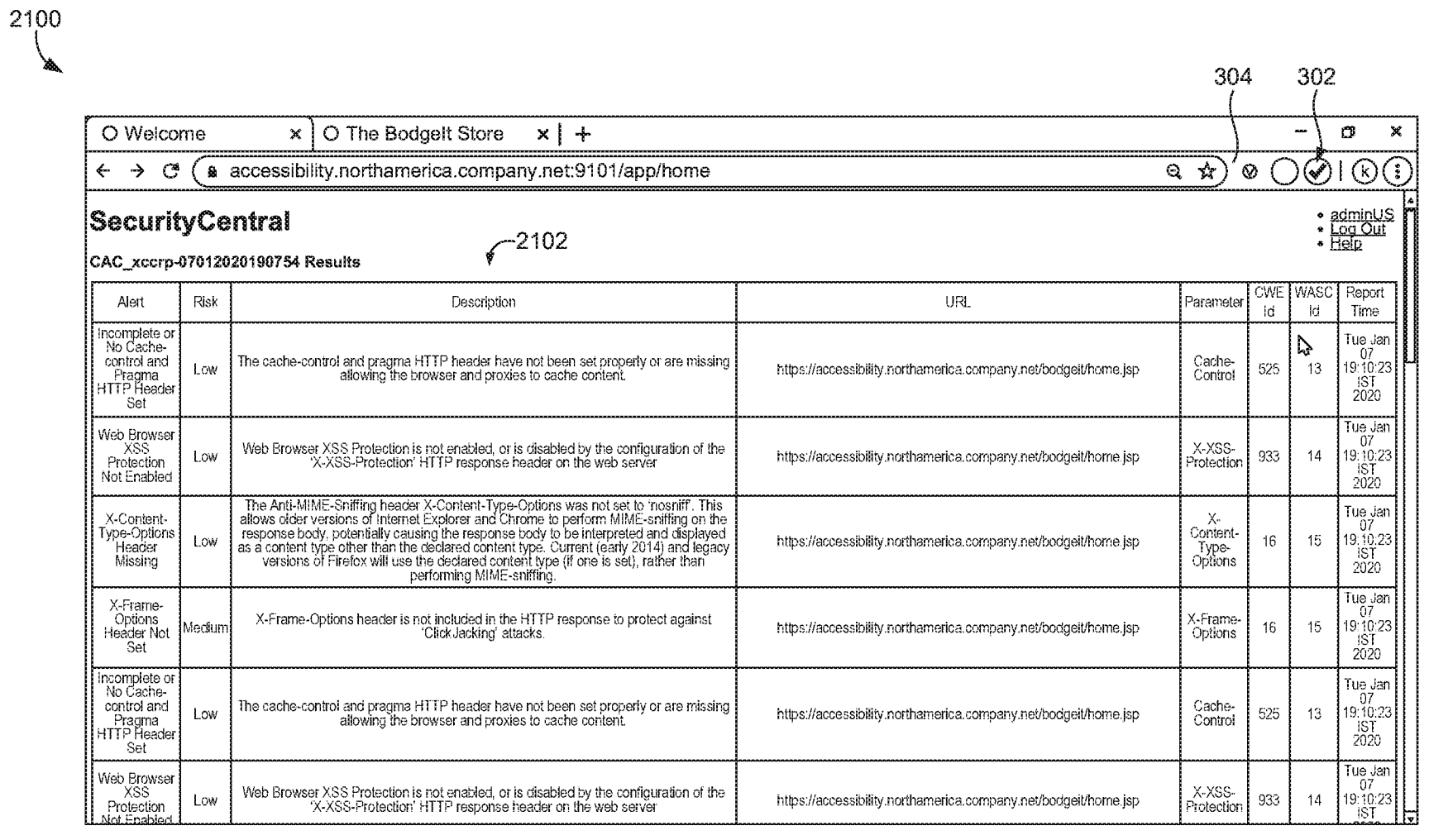

At block 212, a security report that identifies the security vulnerability is generated. The security report may be viewed, for example, in response to a selection of the selectable button 1406 "Check Results" in the graphical user interface 1400 shown in FIG. 20, for example. In some embodiments, the security report 2102 may be displayed as shown in the graphical user interface 2100 of FIG. 21. In some embodiments, a computing device can include a security report generating module, such as security report generating module 118 of computing environment 100 of FIG. 1, that can generate a security report which identifies the security vulnerability. Accordingly, block 212 may be performed by one or more hardware processors configured by machine-readable instructions including a module that is the same as or similar to security report generating module 118, in accordance with one or more implementations. In some embodiments, a database is automatically populated with the security report. In some embodiments, a computing device can include a database population module, such as database population module 122 of computing environment 100 of FIG. 1, that can automatically populate the security report into a database. For this reason, storing of a security report may be performed by one or more hardware processors configured by machine-readable instructions including a module that is the same as or similar to database population module 122, in accordance with one or more implementations.

Hereinafter, an example computing environment is described with regard to the systems, methods, and computer-media described hereinabove. Turning to FIG. 22, an example computing environment is depicted, in accordance with an embodiment of the present invention. It will be understood by those of ordinary skill in the art that the example computing environment 2200 is just one example of a suitable computing environment and is not intended to limit the scope of use or functionality of the present invention. Similarly, the computing environment 2200 should not be interpreted as imputing any dependency and/or any requirements with regard to each component and combination(s) of components illustrated in FIG. 22. It will be appreciated by those having ordinary skill in the art that the connections illustrated in FIG. 22 are also examples as other methods, hardware, software, and devices for establishing a communications link between the components, devices, systems, and entities, as shown in FIG. 22, may be utilized in implementation of the present invention. Although the connections are depicted using one or more solid lines, it will be understood by those having ordinary skill in the art that the example connections of FIG. 22 may be hardwired or wireless, and may use intermediary components that have been omitted or not included in FIG. 22 for simplicity's sake. As such, the absence of components from FIG. 22 should be not be interpreted as limiting the present invention to exclude additional components and combination(s) of components. Moreover, though devices and components are represented in FIG. 22 as singular devices and components, it will be appreciated that some embodiments may include a plurality of the devices and components such that FIG. 22 should not be considered as limiting the number of a device or component.

Figure 22:
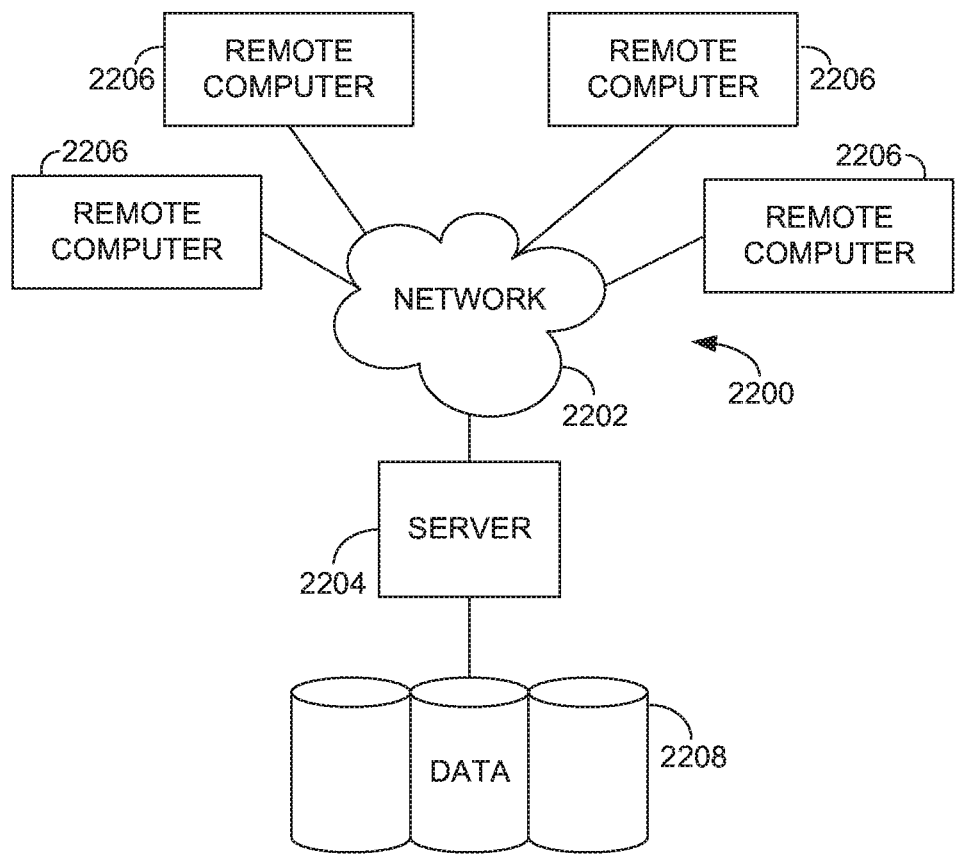
FIG. 22 illustrates and example computing environment, in accordance with one or more implementations.

Continuing, the computing environment 2200 of FIG. 22 is illustrated as being a distributed environment where components and devices may be remote from one another and may perform separate tasks. The components and devices may communicate with one another and may be linked to each other using a network 2202. The network 2202 may include wireless and/or physical (e.g., hardwired) connections. Examples of networks include a telecommunications network of a service provider or carrier, Wide Area Network (WAN), a Local Area Network (LAN), a Wireless Local Area Network (WLAN), a cellular telecommunications network, a Wi-Fi network, a short range wireless network, a Wireless Metropolitan Area Network (WMAN), a Bluetooth® capable network, a fiber optic network, or a combination thereof. The network 2202, generally, provides the components and devices access to the Internet and web-based applications.

The computing environment 2200 comprises a computing device 2204, which may be in the form of a server, as shown in the example of FIG. 22. Although illustrated as one component in FIG. 22, the present invention may utilize a plurality of local servers and/or remote servers in the computing environment 2200. The computing device 2204 may include components such as a processing unit, internal system memory, and a suitable system bus for coupling to various components, including electronic storage, memory, and the like, such as a data store, a database, and/or a database cluster. The system bus may be any of several types of bus structures, including a memory bus or memory controller, a peripheral bus, and a local bus, using any of a variety of bus architectures. By way of example, and not limitation, such architectures include Industry Standard Architecture (ISA) bus, Micro Channel Architecture (MCA) bus, Enhanced Industry Standard Architecture (EISA) bus, Video Electronic Standards Association (VESA) local bus, and Peripheral Component Interconnect (PCI) bus, also known as Mezzanine bus.

The computing device 2204 may include or may have access to computer-readable media. Computer-readable media can be any available media that may be accessed by computing device 2204, and includes volatile and nonvolatile media, as well as removable and non-removable media. By way of example, and not limitation, computer-readable media may include computer storage media and communication media. Computer storage media may include, without limitation, volatile and nonvolatile media, as well as removable and non-removable media, implemented in any method or technology for storage of information, such as computer-readable instructions, data structures, program modules, or other data. In this regard, computer storage media may include, but is not limited to, Random Access Memory (RAM), Read-Only Memory (ROM), Electrically Erasable Programmable Read-Only Memory (EEPROM), flash memory or other memory technology, CD-ROM, digital versatile disks (DVDs) or other optical disk storage, magnetic cassettes, magnetic tape, magnetic disk storage, or other magnetic storage device, or any other medium which can be used to store the desired information and which may be accessed by the computing device 2204. Computer storage media does not comprise signals per se.

Communication media typically embodies computer-readable instructions, data structures, program modules, or other data in a modulated data signal, such as a carrier wave or other transport mechanism, and may include any information delivery media. As used herein, the term "modulated data signal" refers to a signal that has one or more of its attributes set or changed in such a manner as to encode information in the signal. By way of example, and not limitation, communication media includes wired media such as a wired network or direct-wired connection, and wireless media such as acoustic, radio frequency (RF), infrared, and other wireless media. Combinations of any of the above also may be included within the scope of computer-readable media.

In embodiments, the computing device 2204 uses logical connections to communicate with one or more remote computers 2206 within the computing environment 2200. In embodiments where the network 2202 includes a wireless network, the computing device 2204 may employ a modem to establish communications with the Internet, the computing device 2204 may connect to the Internet using Wi-Fi or wireless access points, or the server may use a wireless network adapter to access the Internet. The computing device 2204 engages in two-way communication with any or all of the components and devices illustrated in FIG. 22, using the network 2202. Accordingly, the computing device 2204 may send data to and receive data from the remote computers 2206 over the network 2202.

Although illustrated as a single device, the remote computers 2206 may include multiple computing devices. In an embodiment having a distributed network, the remote computers 2206 may be located at one or more different geographic locations. In an embodiment where the remote computers 2206 is a plurality of computing devices, each of the plurality of computing devices may be located across various locations such as buildings in a campus, medical and research facilities at a medical complex, offices or "branches" of a banking/credit entity, or may be mobile devices that are wearable or carried by personnel, or attached to vehicles or trackable items in a warehouse, for example.

In some embodiments, the remote computers 2206 are physically located in a medical setting such as, for example, a laboratory, inpatient room, an outpatient room, a hospital, a medical vehicle, a veterinary environment, an ambulatory setting, a medical billing office, a financial or administrative office, hospital administration setting, an in-home medical care environment, and/or medical professionals' offices. By way of example, a medical professional may include physicians; medical specialists such as surgeons, radiologists, cardiologists, and oncologists; emergency medical technicians; physicians' assistants; nurse practitioners; nurses; nurses' aides; pharmacists; dieticians; microbiologists; laboratory experts; genetic counselors; researchers; veterinarians; students; and the like. In other embodiments, the remote computers 2206 may be physically located in a non-medical setting, such as a packing and shipping facility or deployed within a fleet of delivery or courier vehicles.

Continuing, the computing environment 2200 includes a data store 2208. Although shown as a single component, the data store 2208 may be implemented using multiple data stores that are communicatively coupled to one another, independent of the geographic or physical location of a memory device. Examples of data stores may store data in the form of artifacts, server lists, properties associated with servers, environments, properties associated with environments, computer instructions encoded in multiple different computer programming languages, deployment scripts, applications, properties associated with applications, release packages, version information for release packages, build levels associated with applications, identifiers for applications, identifiers for release packages, users, roles associated with users, permissions associated with roles, workflows and steps in the workflows, clients, servers associated with clients, attributes associated with properties, audit information, and/or audit trails for workflows. Examples of data stores may also store data in the form of electronic records, for example, electronic medical records of patients, transaction records, billing records, task and workflow records, chronological event records, and the like.

Generally, the data store 2208 includes physical memory that is configured to store information encoded in data. For example, the data store 2208 may provide storage for computer-readable instructions, computer-executable instructions, data structures, data arrays, computer programs, applications, and other data that supports the functions and action to be undertaken using the computing environment 2200 and components shown in the example of FIG. 22.

In a computing environment having distributed components that are communicatively coupled via the network 2202, program modules may be located in local and/or remote computer storage media including, for example only, memory storage devices. Embodiments of the present invention may be described in the context of computer-executable instructions, such as program modules, being executed by a computing device. Program modules may include, but are not limited to, routines, programs, objects, components, and data structures that perform particular tasks or implement particular abstract data types. In embodiments, the computing device 2204 may access, retrieve, communicate, receive, and update information stored in the data store 2208, including program modules. Accordingly, the computing device 2204 may execute, using a processor, computer instructions stored in the data store 2208 in order to perform embodiments described herein.

Although internal components of the devices in FIG. 22, such as the computing device 2204, are not illustrated, those of ordinary skill in the art will appreciate that internal components and their interconnection are present in the devices of FIG. 22. Accordingly, additional details concerning the internal construction device are not further disclosed herein.

Also, the present invention has been described in relation to particular embodiments, which are intended in all respects to be illustrative rather than restrictive. Thus the present invention is not limited to these embodiments, but variations and modifications may be made without departing from the scope of the present invention.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system having one or more processors configured to perform a plurality of operations for conducting security penetration testing, the operations comprising:
   recording, via a security extension of a web browser, a user interface workflow;
   generating, via the security extension, a test script that represents the user interface workflow;
   executing the test script in an application, using a proxy port, to recreate the user interface workflow recorded via the security extension of the web browser,
      wherein executing the test script comprises:
         generating a plurality of threads in the application that each (a) correspond to a copy of the test script and (b) apply the recorded user interface workflow based on the test script; and
         executing the plurality of threads in the application in parallel;
   simulating a plurality of cyber-attacks, corresponding at least in part to the plurality of threads, against the user interface workflow recreated by executing the test script in the application;
   identifying a security vulnerability based at least in part on the plurality of cyber-attacks; and
   generating a security report that identifies the security vulnerability.

2. The system of claim 1, wherein the one or more processors are further configured to schedule execution of the test script in the application.

3. The system of claim 1, wherein the one or more processors are further configured to automatically populate a database with the security report.

4. The system of claim 1, wherein the one or more processors are further configured to load the security extension in the web browser.

5. The system of claim 4, wherein the one or more processors are further configured to enable the security extension that is loaded in the web browser using one or more parameters.

6. The system of claim 1, wherein executing the test script further comprises asynchronously executing the plurality of threads in the application.

7. The system of claim 1, wherein the simulating comprises intercepting traffic generated from the test script based on execution of the test script.

8. The system of claim 1, wherein the simulating comprises crawling the test script to locate one or more URLs.

9. The system of claim 1, wherein the simulating comprises spidering one or more URLs in the test script.

10. The system of claim 1, wherein the simulating comprises scanning one or more URLs in the test script.

11. A method for conducting security penetration testing, the method comprising:
  recording, via a security extension of a web browser, a user interface workflow;
  generating, via the security extension, a test script that represents the user interface workflow;
  executing the test script in an application, using a proxy port, to recreate the user interface workflow recorded via the security extension of the web browser,
    wherein executing the test script comprises:
      generating a plurality of threads in the application that each (a) correspond to a copy of the test script and (b) apply the recorded user interface workflow based on the test script; and
      executing the plurality of threads in the application in parallel;
  simulating a plurality of cyber-attacks, corresponding at least in part to the plurality of threads, against the user interface workflow recreated by executing the test script in the application;
  identifying a security vulnerability based at least in part on the plurality of cyber-attacks; and
  generating a security report that identifies the security vulnerability.

12. The method of claim 11, wherein executing the test script further comprises asynchronously executing the plurality of threads in the application.

13. The method of claim 12, wherein executing the test script further comprises parallel executing the plurality of threads in the application.

14. The method of claim 11, wherein the simulating comprises intercepting traffic generated from the test script based on execution of the test script.

15. The method of claim 11, wherein the simulating comprises crawling the test script to locate one or more URLs.

16. The method of claim 11, wherein the simulating comprises spidering one or more URLs in the test script.

17. The method of claim 11, wherein the simulating comprises scanning one or more URLs in the test script.

18. One or more media having instructions executable by one or more processors to facilitate a plurality of operations for conducting security penetration testing, the operations comprising:
  recording, via a security extension of a web browser, a user interface workflow;
  generating, via the security extension, a test script that represents the user interface workflow;
  executing the test script in an application, using a proxy port, to recreate the user interface workflow recorded via the security extension of the web browser,
    wherein executing the test script comprises:
      generating a plurality of threads in the application that each (a) correspond to a copy of the test script and (b) apply the recorded user interface workflow based on the test script; and
      executing the plurality of threads in the application in parallel;
  simulating a plurality of cyber-attacks, corresponding at least in part to the plurality of threads, against the user interface workflow recreated by executing the test script in the application;
  identifying a security vulnerability based at least in part on the plurality of cyber-attacks; and
  generating a security report that identifies the security vulnerability.

19. The one or more media of claim 18, wherein the simulating comprises:
  intercepting traffic generated from the test script based on execution of the test script;
  crawling the test script to locate one or more URLs;
  spidering the one or more URLs in the test script; and
  scanning the one or more URLs in the test script.

20. The system of claim 1, wherein the security extension is configured to record, at a single web browser, the user interface workflow.

21. The system of claim 20, wherein the one or more processors comprise hardware processors configured to record, via the security extension of the single web browser, the user interface workflow.

22. The system of claim 1, wherein the one or more processors comprise hardware processors configured to (a) record, via the security extension of the web browser, the user interface workflow and (b) locate all Universal Resource Locators (URLs) present in the test script.

23. The system of claim 22, wherein the one or more processors are further configured to initiate operations that include virtually attacking each of the URLs.

24. The system of claim 23, wherein the operations comprise identifying whether any of the virtual attacks were able to maliciously penetrate any of the URLs.

25. The method of claim 11, wherein the proxy port is used by the application to send recorded requests, associated with the recorded user interface workflow and with the executing of the plurality of threads in the application in parallel, outward from the application to an internet connection.

26. The method of claim 25, wherein the proxy port is further used by the application to receive responses to the recorded requests and provide those responses to the application.

* * * * *